US012131084B2

(12) United States Patent
Osaki et al.

(10) Patent No.: US 12,131,084 B2
(45) Date of Patent: Oct. 29, 2024

(54) APPLICATION DELIVERY METHOD, APPLICATION DELIVERY SYSTEM, AND APPLICATION DELIVERY DEVICE

(71) Applicant: SHARP KABUSHIKI KAISHA, Osaka (JP)

(72) Inventors: Ritsuko Osaki, Sakai (JP); Tatsuya Etoh, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 18/231,286

(22) Filed: Aug. 8, 2023

(65) Prior Publication Data

US 2024/0053936 A1 Feb. 15, 2024

(30) Foreign Application Priority Data

Aug. 9, 2022 (JP) .................... 2022-127259

(51) Int. Cl.
*G06F 3/12* (2006.01)
(52) U.S. Cl.
CPC ............ *G06F 3/123* (2013.01); *G06F 3/1203* (2013.01); *G06F 3/1285* (2013.01)
(58) Field of Classification Search
CPC ....... G06F 3/123; G06F 3/1203; G06F 3/1285
USPC ....................................................... 358/1.13
See application file for complete search history.

(56) References Cited

U.S. PATENT DOCUMENTS

| 8,305,591 B2 | 11/2012 | Akiyoshi et al. |
| 8,516,475 B2 | 8/2013 | Akiyoshi et al. |
| 8,752,041 B2 | 6/2014 | Akiyoshi et al. |
| 9,019,516 B2 | 4/2015 | Akiyoshi et al. |
| 9,167,113 B2 | 10/2015 | Akiyoshi et al. |
| 11,941,303 B2 * | 3/2024 | Kai ........ G06F 3/1228 |
| 2004/0109188 A1 | 6/2004 | Akiyoshi et al. |
| 2008/0055625 A1 | 3/2008 | Akiyoshi et al. |
| 2008/0066084 A1 | 3/2008 | Akiyoshi et al. |
| 2008/0098389 A1 | 4/2008 | Akiyoshi et al. |
| 2013/0114095 A1 | 5/2013 | Akiyoshi et al. |
| 2013/0258407 A1 | 10/2013 | Akiyoshi et al. |
| 2021/0255812 A1 * | 8/2021 | Nishikawa ......... G06F 3/1257 |
| 2022/0374180 A1 * | 11/2022 | Nakajima ........... G06F 3/1203 |
| 2023/0185503 A1 * | 6/2023 | Hirano ............... G06F 3/1205 358/1.15 |

FOREIGN PATENT DOCUMENTS

| JP | H10-301760 A | 11/1998 |
| JP | 2006-065388 A | 3/2006 |
| JP | 4344203 B2 | 10/2009 |

* cited by examiner

Primary Examiner — Allen H Nguyen
(74) Attorney, Agent, or Firm — ScienBiziP, P.C.

(57) ABSTRACT

A method of delivering an application, includes: accepting a delivery request instruction for an application; acquiring device information on an optional device installed to a device having output the delivery request instruction for the application; determining whether or not the optional device compatible with an operating condition of the application pertaining to the delivery request instruction is installed on the basis of the acquired device information; and controlling delivery of the application to the device.

15 Claims, 21 Drawing Sheets

FIG. 3

| APPID | APPLICATION | VENDOR | VERSION | RELEASE DATE | COMPATIBLE OPTIONAL DEVICE | RECOMMENDED OPTIONAL DEVICE |
|---|---|---|---|---|---|---|
| APP050 | Application AA | sample.com | 0.1.0 | 2021/03/01 | SADDLE FINISHER | HIGH-CAPACITY SHEET FEED TRAY |
| APP049 | Application BB | sample.com | 0002.0000.0000 | 2021/01/20 | | INTERNET FAX EXPANSION KIT |
| APP048 | Application CC | sample.com | 00.01.00 | 2020/12/20 | IC CARD READER-WRITER | |
| APP047 | Application DD | sample.com | 1.0.13 | 2020/09/01 | SADDLE FINISHER | PUNCH UNIT |
| APP046 | Application EE | abc.com | 1.0.0 | 2020/07/30 | SPF | APPLICATION EXPANSION KIT |
| ... | ... | ... | ... | ... | ... | ... |

| DEVICE ID | MODEL NAME | DEVICE TYPE | INSTALLATION SITE | IP ADDRESS |
|---|---|---|---|---|
| ME001 | MX-747BO | MULTIFUNCTION PERIPHERAL | ENGINEERING DEPT. ROOM | 192.168.100.10 |
| ME002 | FX-373JL | FAX MACHINE | GENERAL AFFAIRS DEPT. ROOM | 192.168.100.20 |
| ME003 | SP-321NE | PRINTER | ENGINEERING DEPT. ROOM | 192.168.100.11 |
| ME004 | MX-878AN | MULTIFUNCTION PERIPHERAL | FINANCE DEPT. ROOM | 192.168.100.30 |
| ME005 | MX-380AB | COPY MACHINE | ENGINEERING DEPT. ROOM | 192.168.100.13 |
| ... | ... | ... | ... | ... |

| RESTRICTION INFORMATION | OPTIONAL DEVICE | DISPLAY ICON | SELECTION OPERATION | DISPLAY CONTENT |
|---|---|---|---|---|
| FIRST RESTRICTION INFORMATION | REQUIRED | ICON (RED) | POP-UP DISPLAY | "OPTIONAL DEVICE THAT MEETS OPERATING CONDITION OF THIS APPLICATION IS NOT INSTALLED" |
| SECOND RESTRICTION INFORMATION | RECOMMENDED | ICON (YELLOW) | POP-UP DISPLAY | "OPTIONAL DEVICE RECOMMENDED FOR OPERATING CONDITION OF THIS APPLICATION IS NOT INSTALLED" |

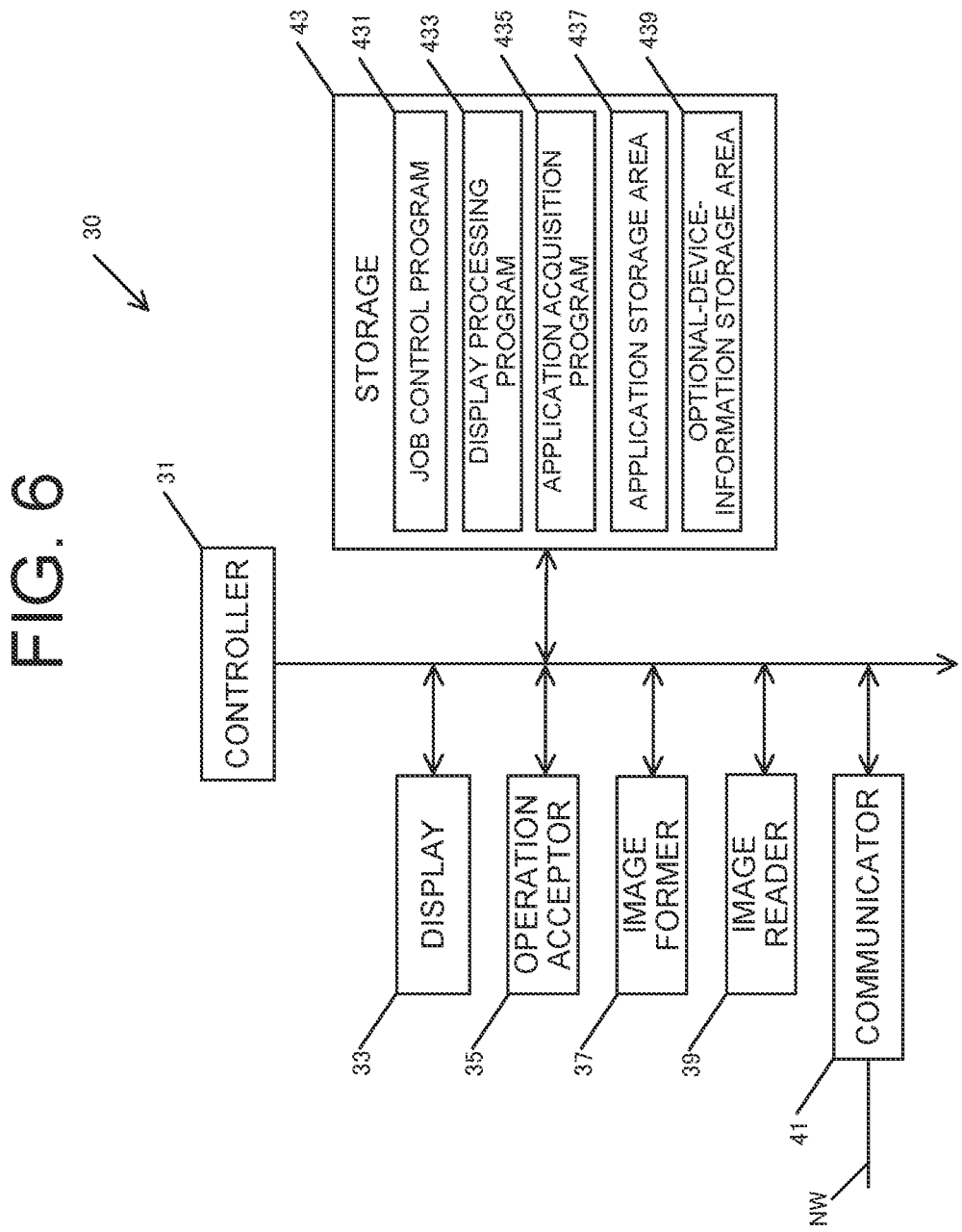

FIG. 21

| DEVICE ID | MODEL NAME | DEVICE TYPE | INSTALLED OPTIONAL DEVICE | INSTALLED APP ID | INSTALLATION SITE | IP ADDRESS |
|---|---|---|---|---|---|---|
| ME001 | MX-747BO | MULTIFUNCTION PERIPHERAL | SADDLE FINISHER HIGH-CAPACITY SHEET FEED TRAY | APP050 | ENGINEERING DEPT. ROOM | 192.168.100.10 |
| ME002 | FX-373JL | FAX MACHINE | INTERNET FAX EXPANSION KIT | APP049 | GENERAL AFFAIRS DEPT. ROOM | 192.168.100.20 |
| ME003 | SP-321NE | PRINTER | HIGH-CAPACITY SHEET FEED DESK | — | ENGINEERING DEPT. ROOM | 192.168.100.11 |
| ME004 | MX-878AN | MULTIFUNCTION PERIPHERAL | HIGH-CAPACITY SHEET FEED TRAY | — | FINANCE DEPT. ROOM | 192.168.100.30 |
| ME005 | MX-380AB | MULTIFUNCTION PERIPHERAL | — | … | ENGINEERING DEPT. ROOM | 192.168.100.13 |
| … | | | | | | |

1933

APPLICATION DELIVERY METHOD, APPLICATION DELIVERY SYSTEM, AND APPLICATION DELIVERY DEVICE

INCORPORATION BY REFERENCE

This application is based upon and claims the benefit of priority from the corresponding Japanese Patent Application No. 2022-127259 filed on Aug. 9, 2022, the entire contents of which are incorporated herein by reference.

BACKGROUND

Field of the Invention

The disclosure relates to an application delivery method and the like.

Description of the Background Art

Delivery methods and delivery devices that provide applications, control programs, etc., to image forming devices via a network have been proposed.

For example, there are known software automatic distribution management systems that eliminate the need for users to check the environment and determine prerequisites at the software distribution destination and that enable automatic distribution of software from the distribution source to the distribution destination, thereby making installation operations at the destination easy and convenient.

In the past, it has been known that an image forming device and the like can display application information on an operation panel to determine whether or not an application can be installed.

There are also known information processing devices that prevent the installation of applications on devices that do not meet the operating conditions of the application.

With some image forming devices, a processing device (hereinafter referred to as "optional devices") can be installed to the body of the image forming device to expand its conventional functions. For example, an optional device known as a finisher can be installed near the sheet output portion of the image forming device to execute finishing processing (post-processing) of printed materials in units.

Many applications that run on image forming devices require the installation of an optional device as a prerequisite for use. However, in conventional methods of delivering applications, some applications that do not fully function depending on the installation status of the optional devices because such methods enable the delivery of applications compatible with various models of image forming devices.

In such cases, the users need to have prior knowledge of the application they wish to acquire and the device status, such as the state of optional devices installed, in advance, which is a significant burden for the user.

An object of the disclosure is to provide an application delivery method and the like that can eliminate disadvantages to users in acquiring each application to be provided by clarifying, for each application to be provided, optional devices that compatible with the operating conditions of each application and optional devices that are recommended for the operating conditions.

In the disclosure, an optional device that is compatible with the operating conditions of an application refers an optional device that has the essential configuration for the application to operate, and when the optional device is not installed, the application cannot operate (hereinafter referred to as "compatible optional device"). An optional device recommended for the application operating conditions refer to an optional device that has a configuration to realize additional functions provided by an application and is preferably installed to realize the additional functions provided by the application although even when not installed operation of the application is possible (hereinafter such optional device is referred to as "recommended optional device").

SUMMARY

To solve the above problems, a method of delivering an application according to the disclosure includes: accepting a delivery request instruction for an application; acquiring device information on an optional device installed to a device that outputted the delivery request instruction for the application; determining whether or not the optional device compatible with an operating condition of the application pertaining to the delivery request instruction is installed on a basis of the acquired device information; and controlling delivery of the application to the device.

An application delivery device according to the disclosure includes: an operation acceptor; and a controller, wherein the controller accepts a delivery request instruction for an application, acquires device information on an optional device installed to a device having output the delivery request instruction for the application, determines whether or not the optional device compatible with an operating condition of the application pertaining to the delivery request instruction is installed on a basis of the device information, and controls delivery of the application to the device.

An image forming device including: an operation acceptor; a controller; and an image former, wherein the controller accepts a delivery request instruction for an application from a user through the operation acceptor, acquires device information on an optional device installed to the image forming device, determines whether or not the optional device compatible with an operating condition of the application pertaining to the delivery request instruction is installed on a basis of the device information, controls introduction of the application, and executes processing related to image formation by the image former on a basis of the introduced application.

According to the disclosure, it is possible to provide an application delivery method and the like that can eliminate disadvantages to users in acquiring each application to be provided by clarifying, for each application to be provided, optional devices that compatible with the operating conditions of each application and optional devices that are recommended for the operating conditions.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a diagram illustrating an application management table according to the first embodiment.

FIG. 4 is a diagram illustrating a device management table according to the first embodiment.

FIG. 5 is a diagram illustrating restriction information according to the first embodiment.

FIG. 6 is a functional configuration diagram of a multifunction peripheral according to the first embodiment.

FIG. 21 is a diagram illustrating a modification.

DETAILED DESCRIPTION

Embodiments of the disclosure will be described below with reference to the accompanying drawings. The following embodiments are mere examples for describing the disclosure, and the technical scope of the disclosure set forth in the claims is not limited to the description given below.

1. First Embodiment

The first embodiment is a mode to receive an application delivery request instruction, acquire device information on an optional device installed to the device outputting the application delivery request instruction, determine, on the basis of the acquired device information, whether or not the optional device compatible with the operating conditions of the application pertaining to the delivery request instruction is attached, and control the delivery of the application to the device.

1.1 Functional Configuration
1.1.1 Overall Configuration

Figure 1:
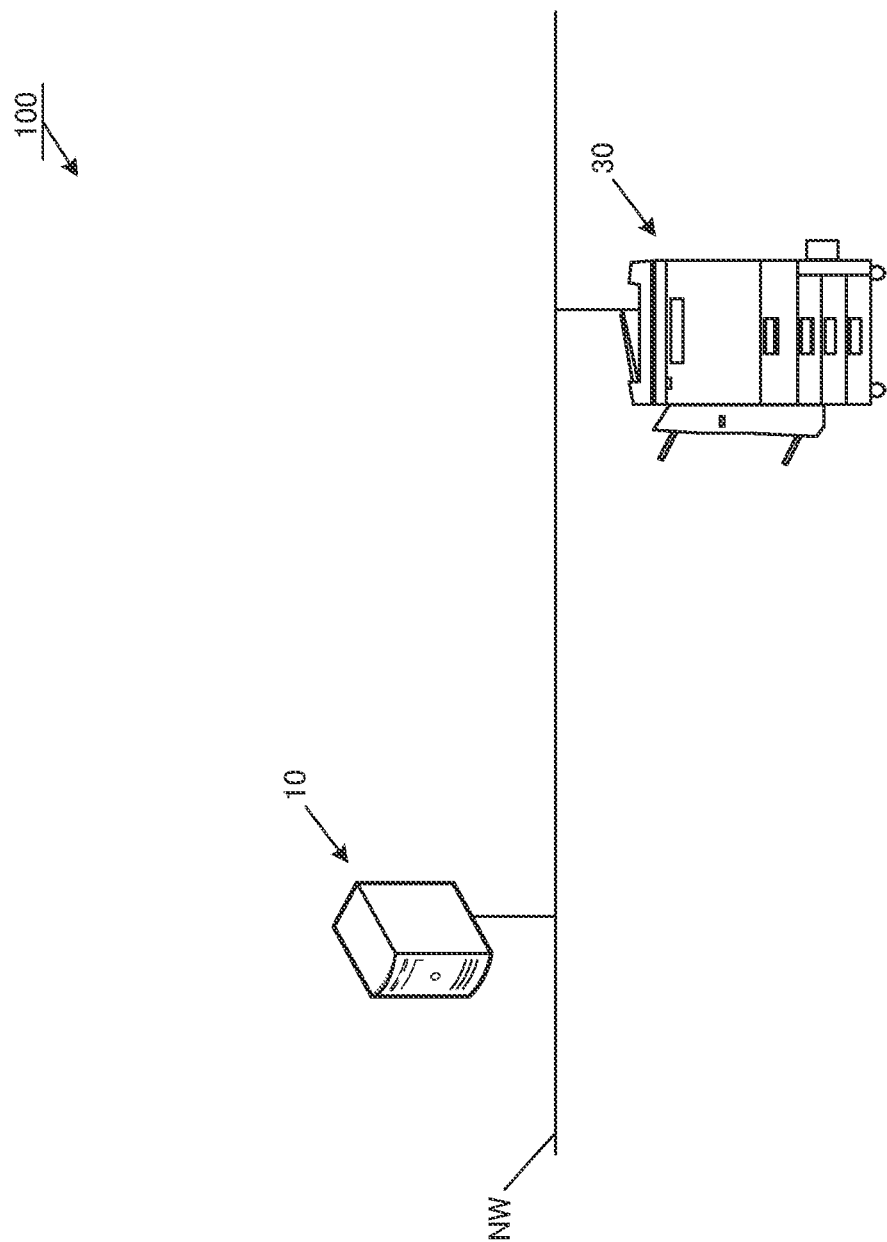
FIG. 1 is a diagram illustrating an application delivery system according to a first embodiment.

FIG. 1 is a schematic diagram illustrating an example configuration of an application delivery system 100 that can provide an application delivery method according to the disclosure. The application delivery system 100 includes an application delivery device 10 and a multifunction peripheral (MFP) 30. The application delivery device 10 and the MFP 30 are connected so that they can communicate via a network NW, such as a local area network (LAN), wide area network (WAN), or the Internet. Although FIG. 1 illustrates an example of one MFP 30 connected to the application delivery device 10, multiple MFPs 30 may be connected, and they may be connected via different networks NW.

1.1.2 Application Delivery Device 10

The application delivery device 10 is an information processing device capable of delivering applications in response to application delivery instructions from users.

Figure 2:
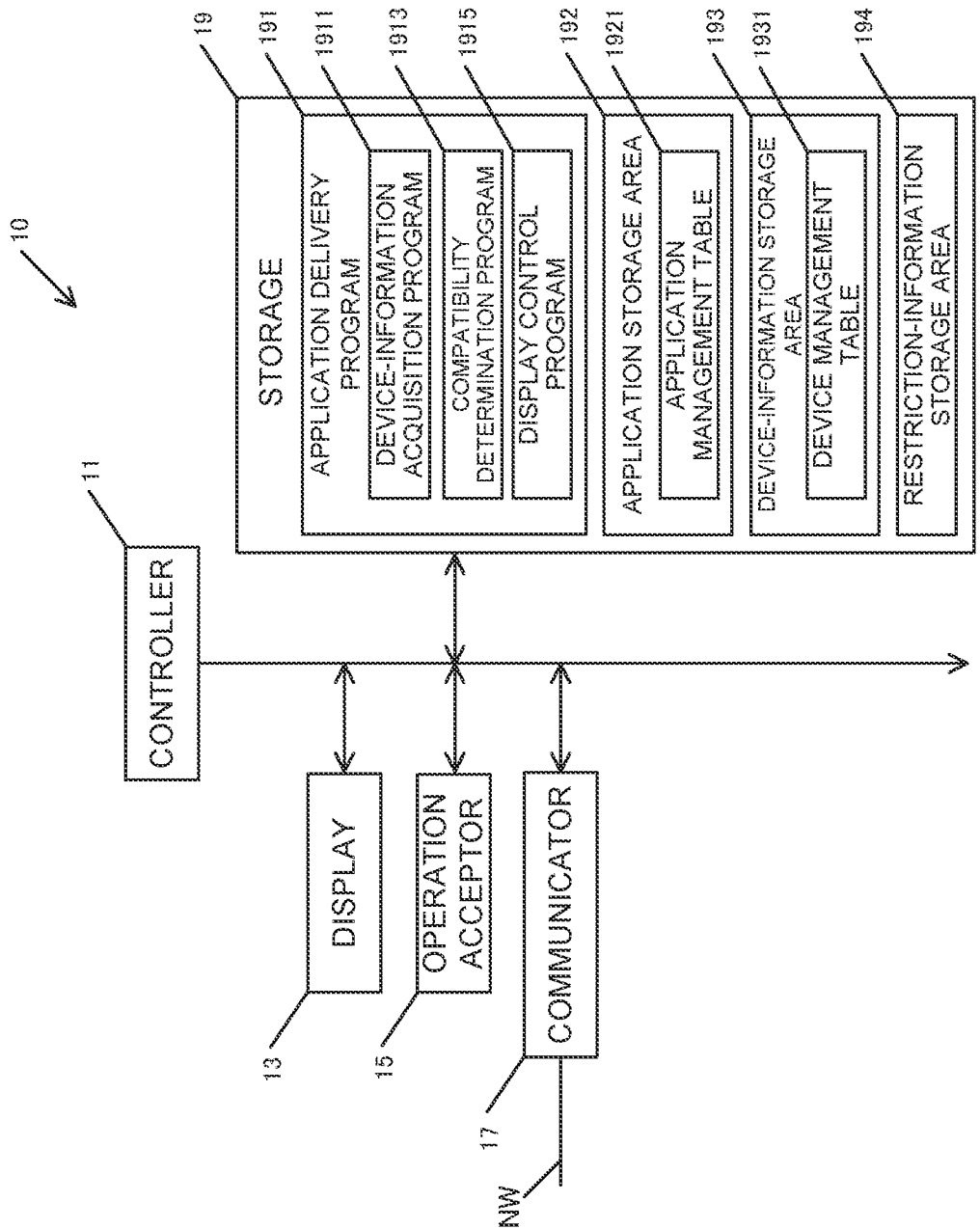
FIG. 2 is a functional configuration diagram of an application delivery device according to the first embodiment.

FIG. 2 is a functional configuration diagram of the application delivery device 10. The application delivery device 10 includes a controller 11, a display 13, an operation acceptor 15, a communicator 17, and a storage 19.

The controller 11 comprehensively controls the application delivery device 10. The controller 11 includes, for example, one or more computing devices (e.g., central processing units (CPUs)). The controller 11 reads and executes various programs stored in the storage 19, thereby implementing respective functions. Some or all of the functional parts including the controller 11 may be implemented by an electronic circuit.

The display 13 displays various types of information to a user or the like. The display 13 displays may be implemented by, for example, a liquid crystal display (LCD), an organic electro-luminescence (EL) display, a micro LED display, or a mini LED display.

The operation acceptor 15 receives input of an operation and information from a user or the like. The operation acceptor 15 can be implemented by, for example, an inputting device such as a keyboard, a mouse, and a touch panel.

The communicator 17 includes an interface for wired/wireless communication via a network line, such as a LAN, a WAN, or the Internet. The communicator 17 communicates with the MFP 30 to deliver applications and acquire necessary information from the MFP 30 regarding the delivery of the applications, such as the installation status of optional devices (e.g., whether optional devices are installed or not; hereinafter referred to as "optional device information").

The storage 19 stores therein various programs and various types of data required for operation of the application delivery device 10. The storage 19 can be implemented by, for example, storage devices such as a random-access memory (RAM), a hard disk drive (HDD), a solid state drive (SSD), and a read-only memory (ROM).

According to the first embodiment, the storage 19 stores therein an application delivery program 191 and secures an application storage area 192, a device-information storage area 193, and a restriction-information storage area 194.

The application delivery program 191 is a program that is read by the controller 11 when processing related to application delivery is executed. The application delivery program 191 includes a device-information acquisition program 1911, a compatibility determination program 1913, and a display control program 1915.

The device-information acquisition program 1911 is a program that is read by the controller 11 when the optional device information of the MFP 30 that outputs an application selection instruction or application acquisition instruction (hereinafter also referred to as application delivery requests) is acquired. The controller 11, which has read the device-information acquisition program 1911, functions as an acquirer by controlling the communicator 17, etc., and acquires the optional device information of the MFP 30 that outputted the application delivery request by using a device management table 1931 stored in the device-information storage area 193.

The compatibility determination program 1913 is a program read by the controller 11 when whether or not the optional device information (presence or absence of an optional device) for the MFP 30 that outputted the application delivery request is compatible with the operating condition of the application. The controller 11 that has read the compatibility determination program 1913 uses an application management table 1921 stored in the application storage area 192 to check whether or not a compatible optional device (or a recommended optional device) is installed to the MFP 30 that has outputted application delivery request to determine the compatibility of the MFP 30 to the application.

The display control program 1915 is a program read by the controller 11 when the display of the application delivery screen described below is controlled for the delivery of applications. The controller 11 that has read the display control program 1915 can function as an acceptor by controlling the display of the application delivery screen displayed on the display 33 of the MFP 30.

The application storage area 192 is a storage area that stores therein applications that can be delivered in response to application delivery requests from the MFP 30 or other devices. The application storage area 192 stores therein the application management table 1921 for managing a corresponding application.

The application management table 1921 will now be described with reference to FIG. 3. FIG. 3 illustrates an example data structure of the application management table 1921. The application management table 1921 has the following registration items: APPID, application, vendor, version, release date, compatible optional device, and recommended optional device.

APPID is an identifier for uniquely identifying an application. Application represents the name of the application. Vendor represents the name of the vendor supplying the application. Version represents the version name of the application, and release date represents the release date of the application. Compatible optional devices represent the optional devices that is compatible with the operating conditions of the application, and recommended optional device represent the optional device recommended for the operating conditions of the application.

For example, the application name of the application identified by the APPID "APP050" is "Application AA." The application "Application AA" has become available from the vendor "sample.com" on "2021/03/01" (release date), and its version name is "0.1.0."

Here, "Application AA" is, for example, an example of an application that is a type of bookbinding application, whose compatible optional device is a saddle finisher for stapling and saddle-stapling.

The application "Application AA" is also an example of an application of which a high-capacity sheet feeding tray is the recommended optional device. For example, when the number of copies of a document to be produced is large, a standard sheet feeding tray requires repeated feeding. Therefore, if a high-capacity tray is installed as the recommended optional device, the number of times of sheet feeding can be reduced. In environments in which users cannot work nearby, such as at night, it is possible to create a large volume of documents without sheet feeding. The high-capacity sheet feeding tray is the recommended optional device because a standard sheet feeding tray can be used depending on the user's usage situation.

Referring back to FIG. 2, the device-information storage area 193 stores therein the device management table 1931 that manages the identification information, etc., of the MFP 30 so that the MFP 30 or the like can be connected via the network NW.

The device management table 1931 will now be described with reference to FIG. 4. FIG. 4 illustrates an example of a data structure of the device management table 1931. The device management table 1931 has the following registration items: device ID, model name, device type, installation site, and IP address.

Device ID represents an identifier that uniquely identifies the MFP 30 and other devices (e.g., fax machines, copy machines, etc.). Model name represents the model name of each device. Device type represents the type of the image forming device (MFP, fax machine, printer, or copy machine). Installation site represents the location of each device. IP address represents an IP address on the network NW.

For example, the device identified by the device ID "ME001" has the model name "MX-747BO" and the device type "MFP." The device is installed in the "Engineering Department room" and is assigned an IP address "192.168.100.10" on the network NW, for example.

Referring back FIG. 2, the restriction-information storage area 194 is a storage area that stores therein restriction information to be displayed when a compatible optional device or recommended optional device that is compatible with the operating conditions of the application for which a delivery instruction has been received is not installed.

The restriction information to be stored in the restriction-information storage area 194 is described with reference to FIG. 5. FIG. 5 is a diagram illustrating restriction information of the first embodiment. The restriction information according to the first embodiment includes first restriction information to be displayed when the compatible optional device is not installed and second restriction information to be displayed when the recommended optional device is not installed.

When the display of the first restriction information is determined in accordance with the determined results of the application compatibility described below, the controller 11 displays a display icon (e.g., display color: red) representing that a restriction is imposed on the acquisition of the corresponding application. Then, when a user selects the display icon, the controller 11 displays a pop-up message with the following display content: "Optional device that meets operating condition of this application is not installed."

When the second restriction information is determined in accordance with the determined results of the application compatibility, the controller 11 displays a display icon (e.g., display color: yellow) representing that a partial restriction is imposed on the functions provided by the corresponding application. Then, when a user selects the display icon, the controller 11 displays a pop-up message with the following display content: "Optional device recommended for operating condition of this application is not installed."

1.1.3 MFP 30

The MFP 30 is an image forming device capable of processing in each operation mode, such as printing, faxing, and scanning, in a single housing. In the present embodiment, the MFP 30 is described as an embodiment of the image forming device, but other image forming devices such as fax machines, printers, and copy machines can be applied besides the MFP 30.

FIG. 6 is a functional configuration diagram of the MFP 30. The MFP 30 includes a controller 31, a display 33, an operation acceptor 35, an image former 37, an image reader 39, a communicator 41, and a storage 43.

The controller 31 comprehensively controls the MFP 30. The controller 31 is implemented by, for example, one or more arithmetic devices (such as CPUs). The controller 31, for example, reads and executes various programs stored in the storage 43, thereby implementing functions thereof.

The display 33 displays various types of information to the user, etc. The display 33 can be implemented by, for example, an LCD, an organic EL display, a micro LED display, a mini LED display, and the like.

The operation acceptor 35 receives input of information from the user, for example. The operation acceptor 35 may be implemented by a touch panel display that allows input via the display 33. In this case, the input method for the touch panel display may be, for example, a resistive method, an infrared method, an electromagnetic induction method, or a capacitive method.

The image former 37 forms an image based on image data on a sheet or a recording medium. The image former 37 feeds a paper from a sheet feeder (not illustrated), forms an image based on the image data on the sheet, and then outputs the sheet to a sheet output portion (not illustrated). The image former 37 can be implemented by, for example, a laser printer using an electrophotographic method. In this case, the image former 37 forms images using toners supplied from toner cartridges (not illustrated) corresponding to respective toner colors (for example, cyan, magenta, yellow, and black).

The image reader 39 scans and reads a document image to generate image data. The image reader 39 can be, for example, implemented by a scanner device including an image sensor such as a charge coupled device (CCD) or a contact image sensor (CIS). No particular limitations are placed on the configuration of the image reader 39 as long as the image reader 39 is configured to generate image data by reading a reflected light image from a document image using an image sensor.

The communicator 41 includes an interface for wired/wireless communication via a network line, such as a LAN, a WAN, or the Internet. The communicator 41 communicates with the application delivery device 10 and outputs necessary information such as optional device information to the application delivery device 10 regarding the delivery of applications.

The storage 43 stores therein various kinds of data and various programs necessary for operation of the MFP 30. The storage 43 may be implemented by, for example, a storage device such as a RAM, an HDD, an SSD, and a ROM.

In the first embodiment, the storage 43 stores therein a job control program 431, a display processing program 433, and an application acquisition program 435, and reserves an application storage area 437 and an optional-device-information storage area 439.

The job control program 431 is a program read by the controller 31 to control processing in each operation mode, such as printing, faxing, and scanning, on a job-by-job basis. The controller 31 that has read the job control program 431 executes a job by controlling the display 33, the operation acceptor 35, the image former 37, the image reader 39, the communicator 41, and the like.

The display processing program 433 is a program read by the controller 31 when the screen display of the display 33 is to be controlled. The controller 31 can display the application delivery screen supplied by the application delivery device 10 on the display 33.

The application acquisition program 435 is a program read by the controller 31 when applications provided by the application delivery device 10 is acquired. The controller 31 that has read the application acquisition program 435 outputs an application delivery request accepted via the application delivery screen to the application delivery device 10. The controller 31 outputs the optional device information stored in the optional-device-information storage area 439 to the application delivery device 10 in response to a device information acquisition request from the application delivery device 10.

The application storage area 437 is a storage area that stores therein applications, etc., acquired from the application delivery device 10.

The optional-device-information storage area 439 is a storage area that stores therein information related to optional devices installed to the device body. The optional device information stored in the optional-device-information storage area 439 is appropriately read in accordance with an acquisition request from the application delivery device 10 and output to the application delivery device 10.

1.2 Process Flow 1.2.1 Overall Process

Figure 7:
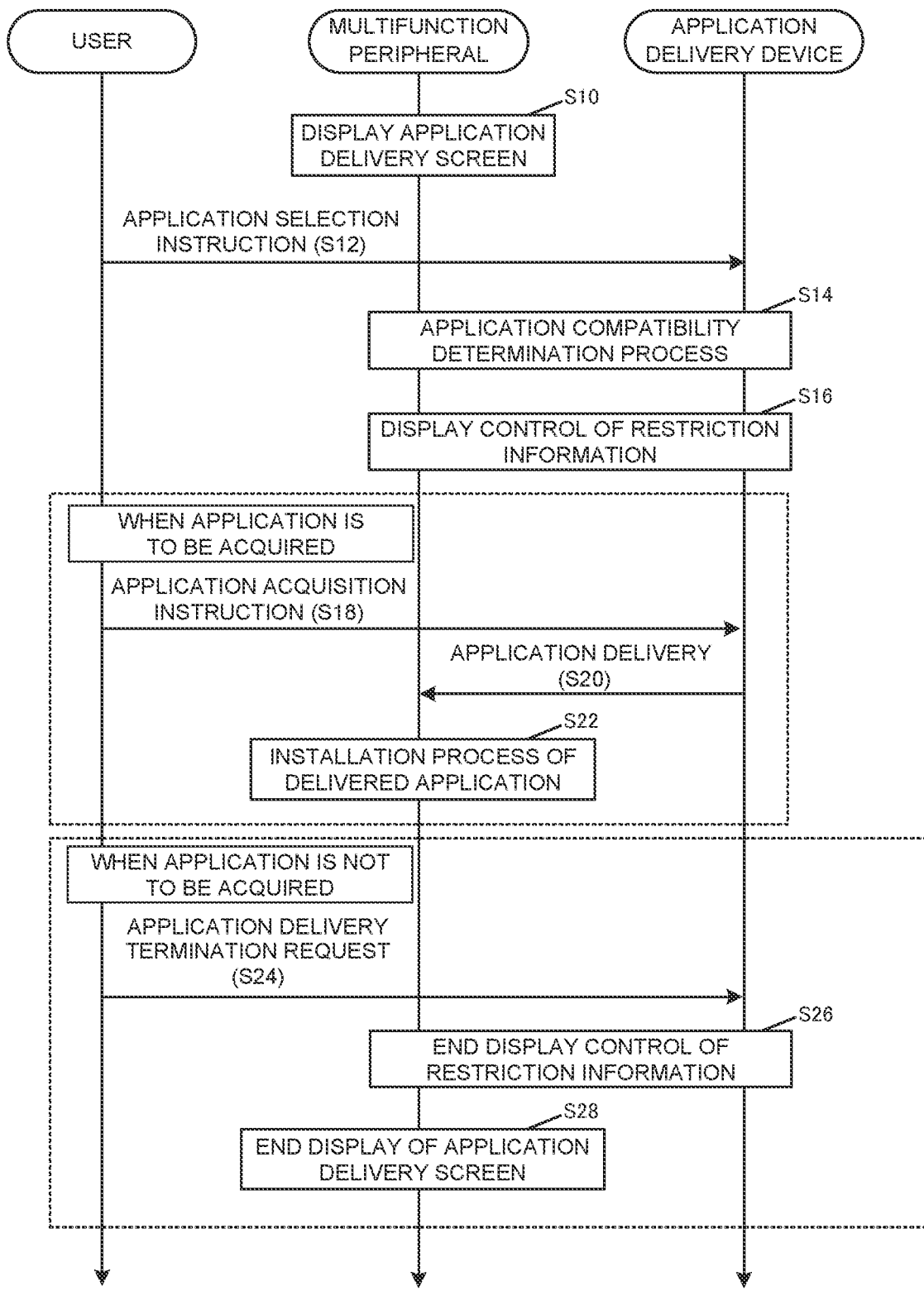
FIG. 7 is a sequence diagram for explaining overall processing according to the first embodiment.

A process flow according to the first embodiment will now be described. FIG. 7 is a sequence diagram for explaining the overall process according to the first embodiment.

First, the controller 31 of the MFP 30 displays an application delivery screen on the display 33 via application delivery (step S10). There is no particular restriction on the means or method of displaying the application delivery screen on the display 33. For example, an acceptance button or the like may be provided on the home screen displayed on the display 33 by the controller 31 of the MFP 30 as a basic screen to accept instructions to display the application delivery screen.

A user selects a desired application via the application delivery screen. A user's application selection instruction is output to the application delivery device 10 as an application delivery request (step S12).

The controller 11 of the application delivery device 10 that has received the application delivery request executes an application compatibility determination process for application delivery with the MFP 30 (step S14).

On the basis of the results of the application compatibility determination, the controller 11 of the application delivery device 10 controls the display of restriction information pertaining to the application delivery (step S16).

If it is determined to acquire an application on the basis of the results of referencing the application information and restriction information displayed on the application delivery screen, a user enters an acquisition instruction for the application desired to be acquired via the application delivery screen as an application delivery request (step S18).

The application delivery device 10 that has received the application delivery instruction provides the corresponding application to the MFP 30 (step S20).

The controller 31 of the MFP 30 then executes the installation process of the provided application (step S22).

Meanwhile, if it is determined not to acquire an application, a user enters a request to end the application delivery via the application delivery screen (step S24).

The application delivery device 10 that has received the request to end the application delivery ends the display control of the restriction information (step S26).

The controller 31 of MFP 30 then ends the display of the application delivery screen (step S28) to end the series of processes.

1.2.2 Application Compatibility Determination Process

Figure 8:
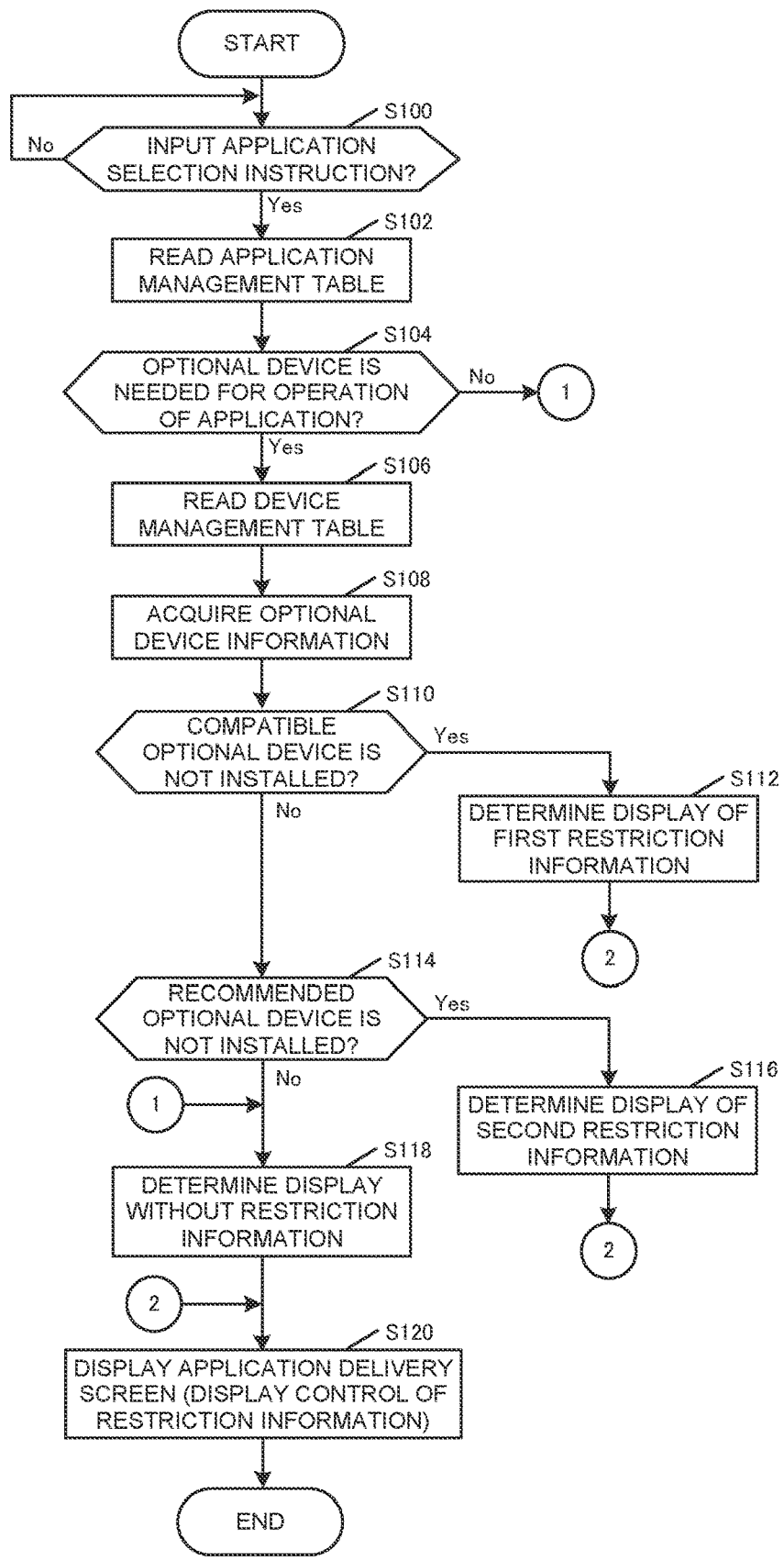
FIG. 8 is a flowchart illustrating a compatibility determination process according to the first embodiment.

An application compatibility determination process according to step S14 in FIG. 7 will now be explained with reference to the flowchart in FIG. 8. The process explained here is mainly executed by the controller 11 of the application delivery device 10 reading the device-information acquisition program 1911, the compatibility determination program 1913, and the display control program 1915 of the application delivery program 191.

The controller 11 of the application delivery device 10 determines whether or not it has received an application selection instruction (application delivery request) from a user via the MFP 30 (step S100). At this time, the controller 11 acquires the device ID (e.g., "ME001" in FIG. 4) of the MFP 30 together with the application selection instruction.

If it is determined that an application selection instruction has been received, the controller 11 reads the application management table 1921 stored in the application storage area 192 (Yes in step S100 to step S102). If it is determined that an application selection request has not been received, the controller 11 waits until it receives a selection instruction for the application (No in step S100).

The controller 11 that has read the application management table 1921 determines whether or not an optional device is required to operate the application for which the selection instruction has been accepted in step S100 (step S104). If it is determined that an optional device is necessary for the operation of the application, the controller 11 refers to the device management table 1931 in FIG. 4 (step S106), communicates using the device ID acquired in step S100, and acquires optional device information of the MFP 30 that has outputted the selection instruction for the application (step S108).

Next, the controller 11 determines whether a compatible optional device is not installed on the basis of the optional device information acquired in step S108 and a registered value (compatible optional device) in the application management table 1921 (step S110).

If it is determined that the compatible optional device is not installed, the controller 11 determines to display the first restriction information (Yes in step S100 to step S112). The controller 11 then shifts the process to step S120 (step S112 to step S120). If it is determined that the compatible optional device is not installed, the controller 11 may restrict the display of the application, or may restrict the delivery of the application.

Meanwhile, if it is determined that the compatible optional device is installed, the controller 11 determines whether a recommended optional device is not installed (No in step S110 to step S114).

If it is determined that the recommended optional device is not installed, the controller 11 determines to display the second restriction information (Yes in step S114 to step S116). The controller 11 then shifts the process to step S120 (step S116 to step S120).

Meanwhile, if it is determined that the recommended optional device is not installed, the controller 11 determines a display without the restriction information (No in step S114 to step S118).

The controller 11 then displays the application delivery screen with display control of the restriction information (step S120).

Even if the controller 11 determines that the compatible optional device is not installed and determines to display the first restriction information (Yes in step S110 to step S112), the controller 11 may determine whether the recommended optional device is not installed and execute step S114 and subsequent steps. For example, if a recommended optional device is not installed in step S114 and the second restriction information is determined to be displayed, both the first and second restriction information can be displayed at the same time so that a user can check the information related to both the compatible optional device and the recommended optional device at the same time. For example, it is expected to make it easier for a user to consider the introduction of an optional device.

1.3 Operation Examples

Figure 9:
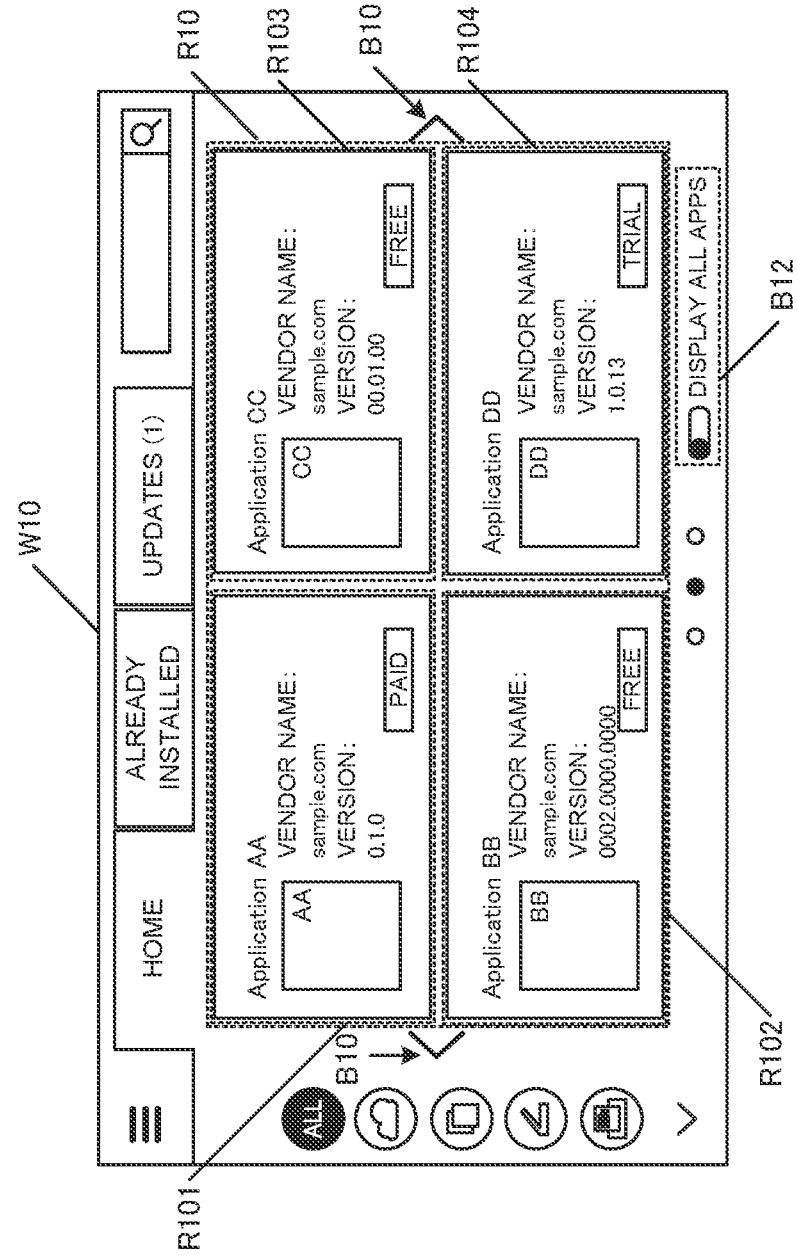
FIG. 9 is a diagram illustrating an operation example of the first embodiment.

Operation examples according to the first embodiment will now be explained. FIG. 9 is a diagram illustrating a configuration example of an application delivery screen W10 that accepts a request by a user to provide an application.

The application delivery screen W10 includes an application display area R10, an application switching button B10, and a button B12 that displays all applications.

The application display area R10 is an area for displaying applications that can be delivered via the application delivery screen W10. FIG. 9 illustrates an example of application display area R10 having the following four individual display areas: an individual display area R101 that displays Application AA, an individual display area R102 that displays Application BB, an individual display area R103 that displays Application CC, and an individual display area R104 that displays Application DD.

The application displayed in the application display area R10 can be switched by a user selecting the application switching button B10. For example, when a user selects the application switching button B10 on the right in the drawing, the controller 11 updates the configuration of the application display area R10 to a combination of individual display areas that display new applications. When a user selects the application switching button B10 on the left in the drawing, the controller 11 returns the configuration of the application display area R10 to a previous combination of individual display areas.

The number of applications (individual display areas) that can be displayed at once in the application display area R10 is not limited to four, but can be changed or set as needed via a setting screen or the like (not illustrated).

The button B12 that displays all applications is a button that accepts the selection of whether or not to display all applications managed in the application management table 1921. When a user selects the button B12 to display all applications, the controller 11 displays all applications managed in the application management table 1921. If the button B12 to display all applications is not selected, the controller 11 restricts the display of applications that are restricted to be delivered via the application delivery screen W10 (applications to which the display of the first restriction information described in the next drawing applies).

Figure 10:
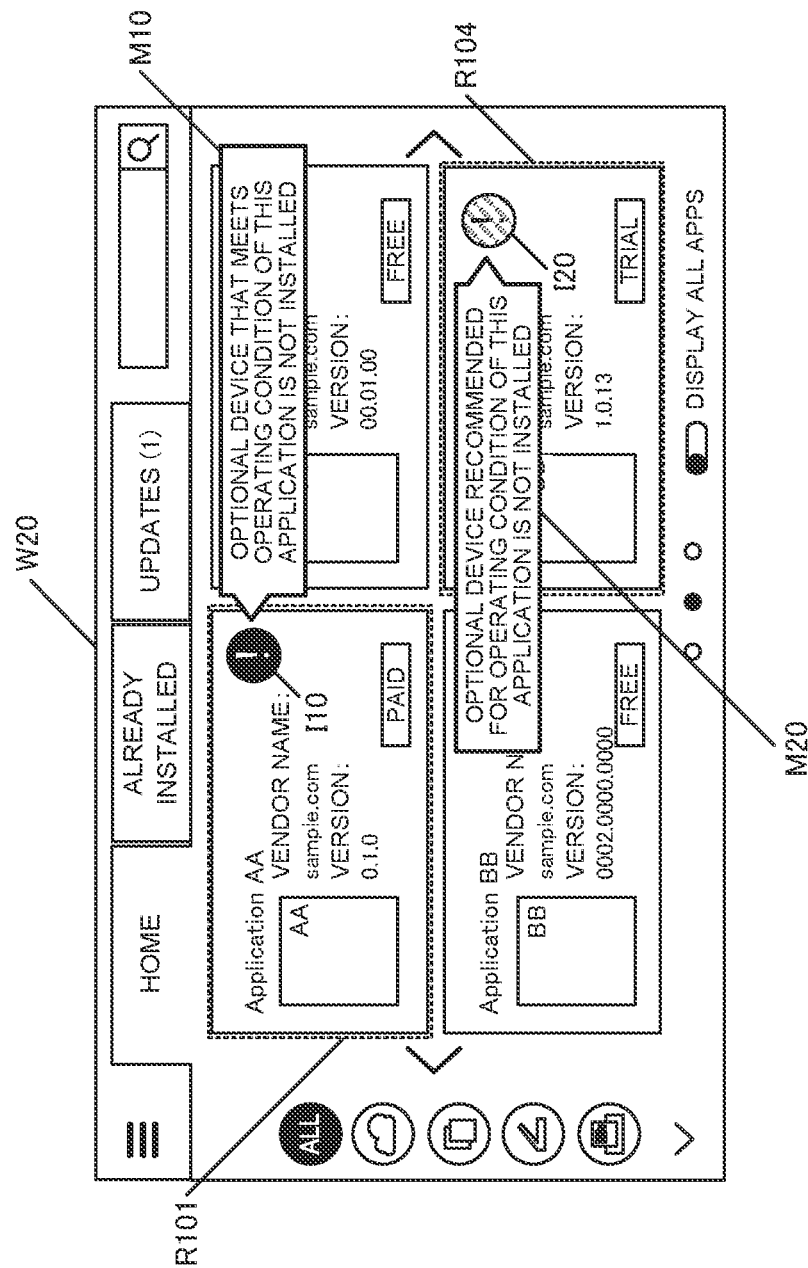
FIG. 10 is a diagram illustrating an operation example of the first embodiment.

FIG. 10 is an example of a display configuration of the application delivery screen W20 that displays an application to which the compatible optional device is not installed and the display of the first restriction information is applied, and an application to which the recommended optional device is not installed and the display of the second restriction information is applied. In FIG. 10, Application AA is described as an example of an application to which the compatible optional device is not installed and the display of the first restriction information is applied, and Application DD is described as an example of an application to which the recommended optional device is not installed and the display of the second restriction information is applied.

As illustrated in FIG. 10, the controller 11 displays a red display icon I10 in the individual display area R101 pertaining to Application AA, indicating that a restriction is imposed on the acquisition of Application AA. Then, when a user selects the display icon I10, the controller 11 displays a pop-up message M10 with the following display content: "Optional device that meets operating condition of this application is not installed."

The controller 11 displays a yellow display icon 120 in the individual display area R104 pertaining to Application DD, indicating that a partial restriction is imposed on the functions provided by Application DD. Then, when a user selects the display icon 120, the controller 11 displays a pop-up message M20 with the following display content: "Optional device recommended for operating condition of this application is not installed."

In this way, by displaying icons in different display modes (display colors) in accordance with the restrictions imposed on the applications, a user can easily grasp the presence of optional devices that are compatible with the operating conditions of the applications or that are recommended for the operating conditions. Instead of displaying the content of the restriction information in a pop-up message, for example, the content of the display can be audibly output.

Figure 11:
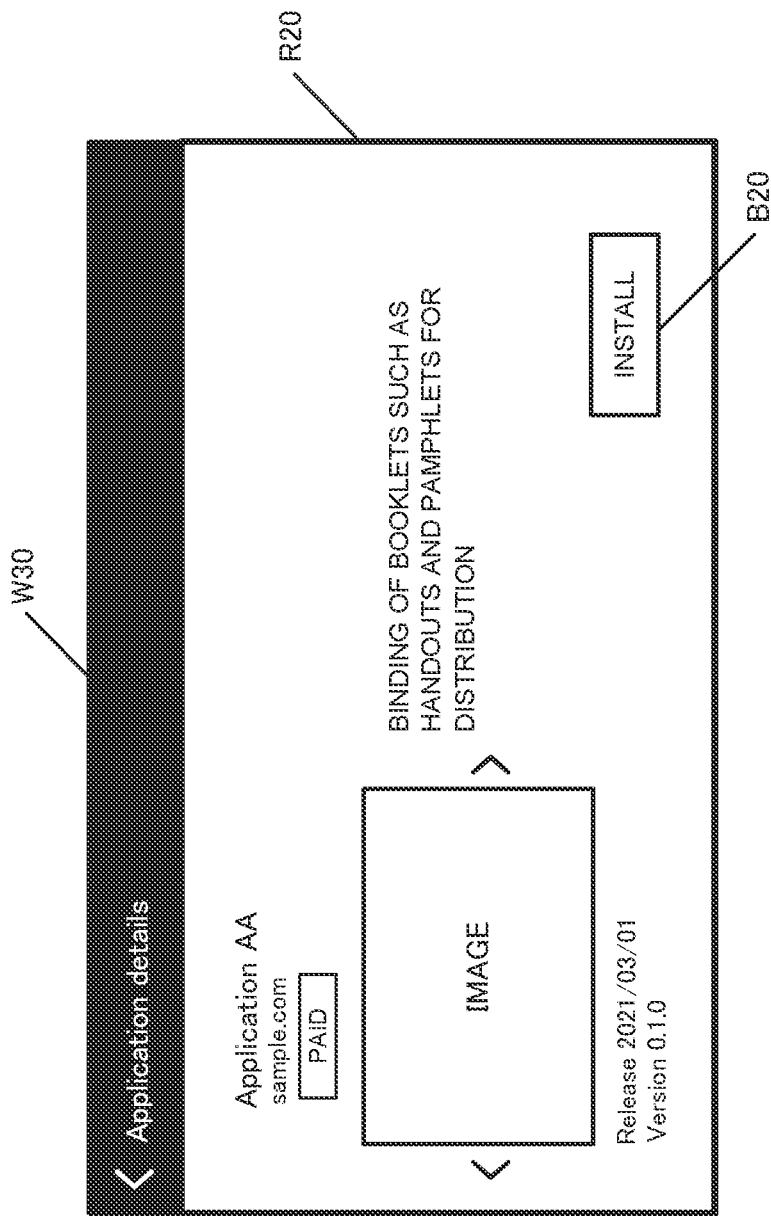
FIG. 11 is a diagram illustrating an operation example of the first embodiment.

FIG. 11 illustrates a configuration example of an application detail screen W30 displayed by the controller 11 in response to a selection operation (e.g., single tap, double tap, touch (long press), swipe, etc.) of the individual display area R101 pertaining to Application AA illustrated in FIG. 9. FIG. 11 illustrates an example configuration of the application detail screen for Application AA, but other applications (Applications BB to DD) illustrated in FIG. 9 can also display the application detail screen by selecting each individual display area (R102 to R104).

The application detail screen W30 includes an application-information display area R20 and an install button B20.

The application-information display area R20 is a display area that displays information related to applications managed by the application management table 1921 illustrated in FIG. 3 and descriptions related to the applications.

The install button B20 is a button that accepts installation instructions for the corresponding application from the user. Upon receiving the user's selection of the install button B20, the controller 11 executes the installation process for the corresponding application (Application AA).

Figure 12:
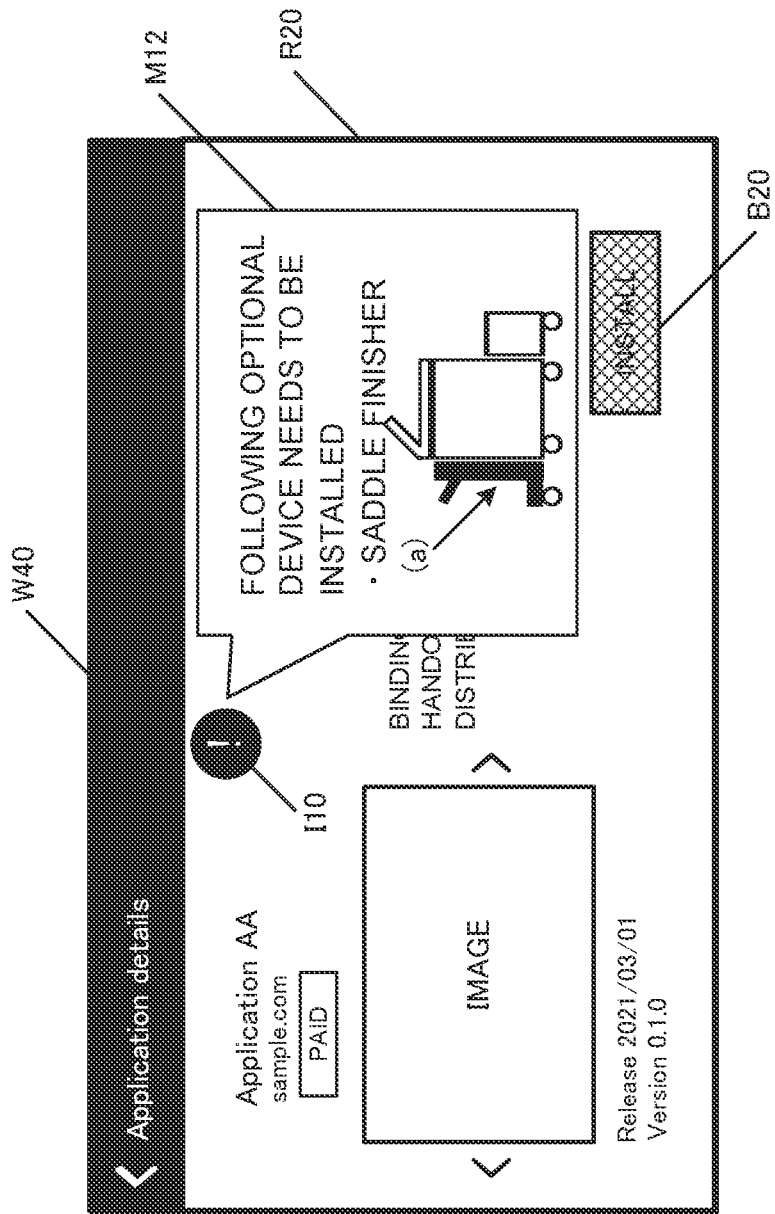
FIG. 12 is a diagram illustrating an operation example of the first embodiment.

FIG. 12 illustrates a configuration example of an application detail screen W40 displayed by the controller 11 in response to a selection operation of the individual display area R101 pertaining to Application AA illustrated in FIG. 10. The screen configuration of the application detail screen W40 illustrated in FIG. 12 can be the same as that of the application detail screen W30 illustrated in FIG. 11, so a description thereof is not repeated here.

Application AA is an example of an application to which the compatible optional device is not installed and the display of the first restriction information is applied. In this case, the controller 11 displays the display icon I10 in the application-information display area R20 indicating that a restriction is imposed on the acquisition of Application AA. Then, when a user selects the display icon I10, the controller 11 displays a pop-up message M12 with the following display content: "Following optional device needs to be installed: saddle finisher." As illustrated in the example in FIG. 12, the corresponding optional device (saddle finisher) may be shown so that it can be identified ((a) in the drawing) to facilitate user understanding.

In addition, the controller 11 displays the install button B20, for example, in gray out mode so that it cannot be selected, in order to restrict the acceptance of a user's instruction to install Application AA.

Figure 13:
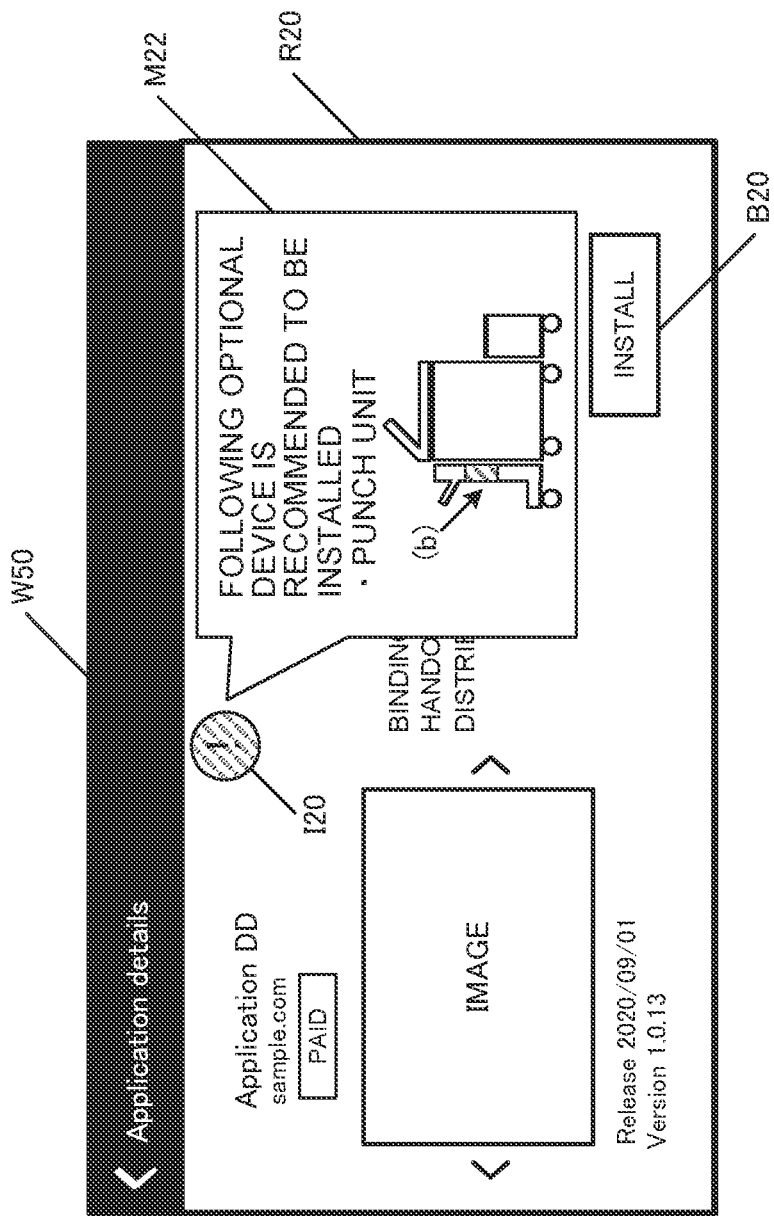
FIG. 13 is a diagram illustrating an operation example of the first embodiment.

FIG. 13 illustrates a configuration example of an application detail screen W50 displayed by the controller 11 in response to a selection operation of the individual display area R103 pertaining to Application DD illustrated in FIG. 10. The screen configuration of the application detail screen W50 illustrated in FIG. 13 can be the same as that of the application detail screen W30 illustrated in FIG. 11, so a description thereof is not repeated here.

In FIG. 13, Application DD is an example of an application to which the recommended optional device is not installed and the display of the second restriction information is applied. In this case, the controller 11 displays the display icon 120 in the application-information display area R20 indicating that partial restrictions are imposed on the functions provided by Application DD. Then, when a user selects the display icon 120, the controller 11 displays a pop-up message M22 with the following display content: "Following optional device is recommended to be installed: punch unit." As illustrated in the example in FIG. 13, the corresponding optional device (punch unit) may be shown so that it can be identified ((b) in the drawing) to facilitate user understanding.

At this time, the controller 11 displays the install button B20 in a selectable manner without restriction on the acceptance of a user's instruction to install Application DD.

The first embodiment describes a mode in which a display icon is displayed when a restriction is imposed on the acquisition of an application or when a partial restriction is imposed on the functions provided by an application, and when the display icon is selected, a pop-up message is displayed to indicate that a compatible optional device or a recommended optional device is not installed.

Figure 14:
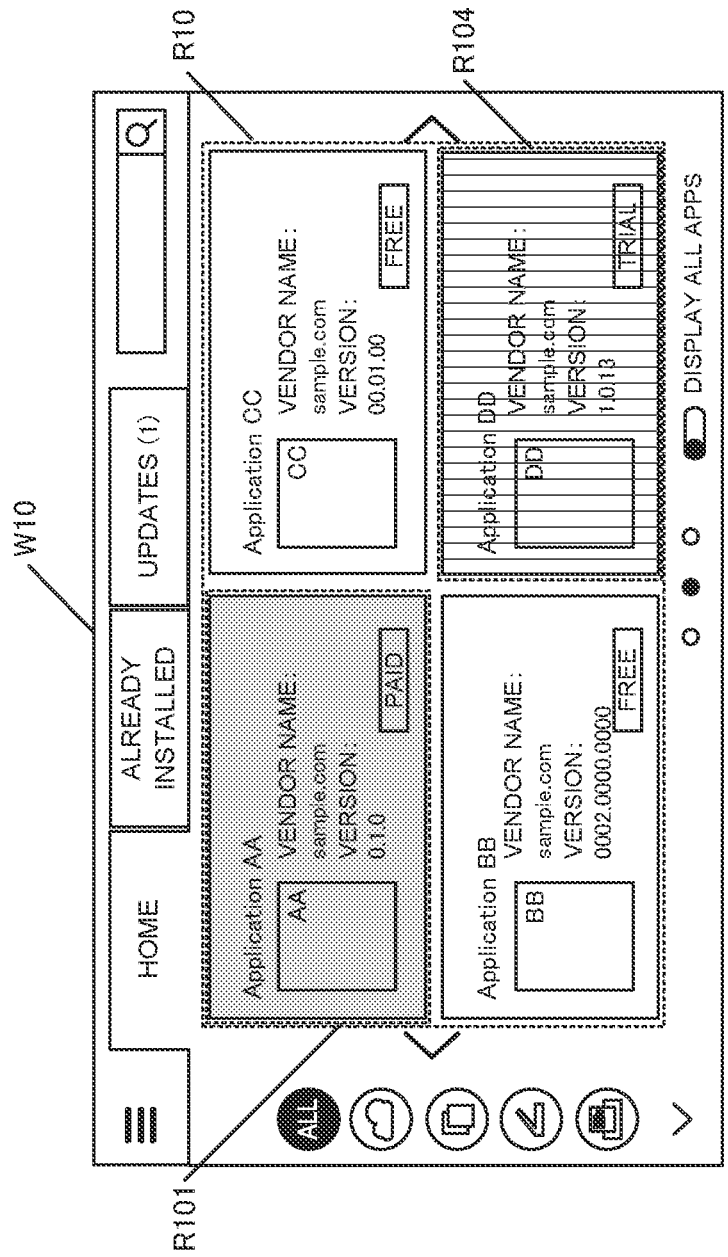
FIG. 14 is a diagram illustrating an operation example of the first embodiment.

As a notification means for when a restriction is imposed on the acquisition of an application or when the functions provided by an application are partially restricted, for example, as illustrated in FIG. 14, the individual display area R101 that displays an application with restriction on acquisition can be grayed out and displayed in a different mode from other applications, allowing (restricting) user selection. It is also possible to display applications that have partial restriction on the functions they provide in a different display mode (individual display area R104) than other applications or the individual display area R101, allowing user selection. For example, the display content of the corresponding individual display area can be displayed by blinking or by using a different font or character size. At this time, it is preferred to have different blinking cycles, character fonts, character sizes, etc., for each individual display area so that each individual display area can be identified. When such a display mode is adopted, it may be difficult for a user to grasp at first glance that a restriction is imposed on the selection of applications. Therefore, it is more preferred to have a configuration in which the content such as "Optional device that meets operating condition of this application is not installed" is notified to the user by message display or voice output in the same way as when the display icon is selected (see FIG. 10).

As described above, the first embodiment can provide an application delivery method and the like that can eliminate disadvantages to users in acquiring each application to be provided by clarifying, for each application to be provided, optional devices that compatible with the operating conditions of each application and optional devices that are recommended for the operating conditions.

2. Second Embodiment

In the second embodiment, when an MFP that outputs an application delivery request is not equipped with an optional device compatible with application operating conditions in the first embodiment, another device to which an optional device compatible with the application operating conditions is searched for on the network NW. When another device to which an optional device compatible with the application operating conditions is installed is detected, this device can be suggested to a user as an installation destination for the application.

2.1. Functional Configuration 2.1.1 Overall Configuration

Figure 15:
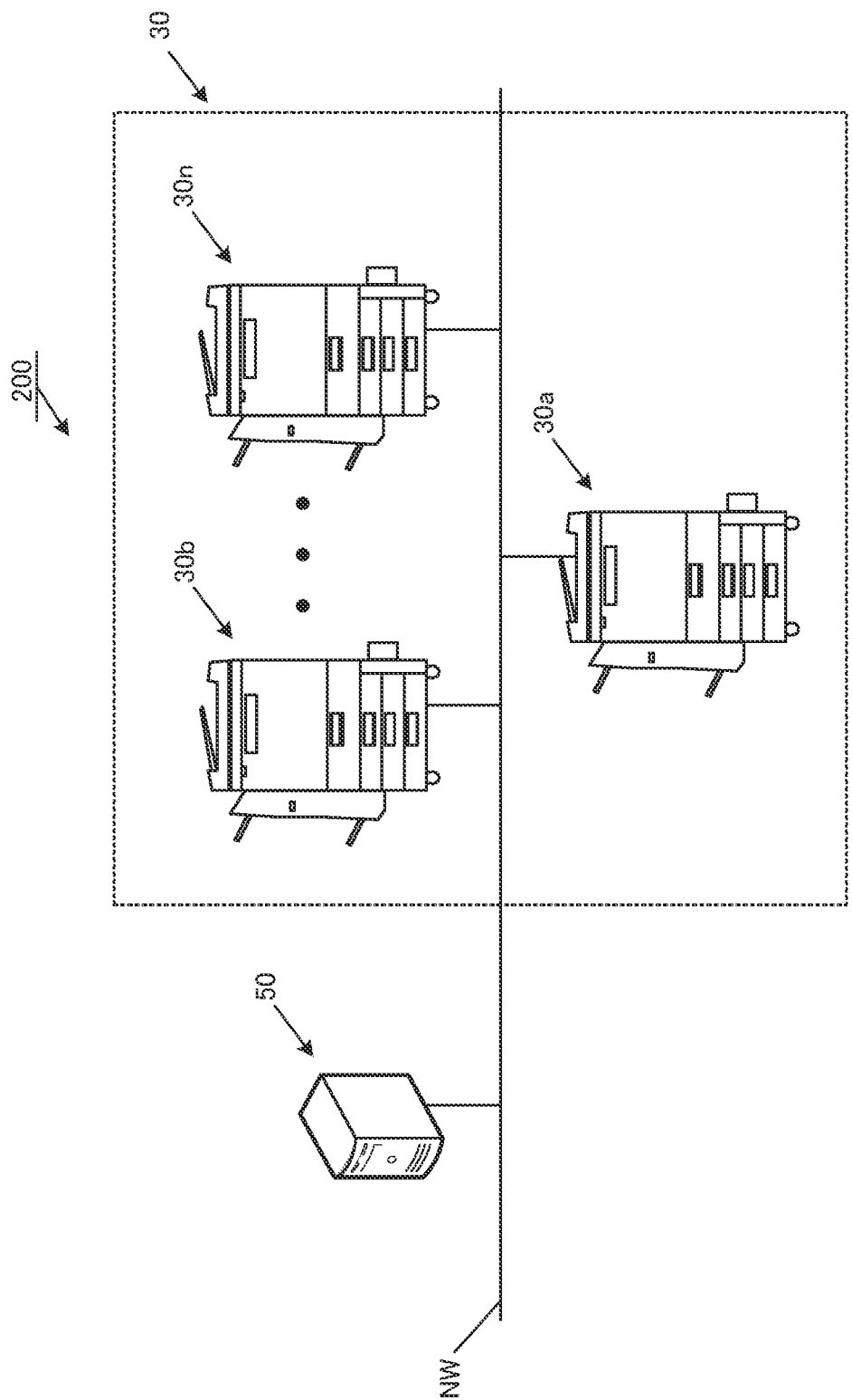
FIG. 15 is a diagram illustrating an application delivery system according to a second embodiment.

FIG. 15 is a diagram schematic illustrating an example configuration of an application delivery system 200 according to the second embodiment. The application delivery system 200 includes an application delivery device 50, an MFP 30a as a device, and MFPs 30b to 30n as other devices. The application delivery device 50, the MFPs 30a, and the MFPs 30b to 30n are connected to communicate with each other via a network NW, such as a LAN, a WAN, or the Internet. In the second embodiment, the device to which an optional device compatible with the application operating conditions is not installed is described as the MFP 30a and other devices are described as MFPs 30b to 30n, but these are simply referred to as MFPs 30 when necessary.

2.1.2 Application Delivery Device 50

Figure 16:
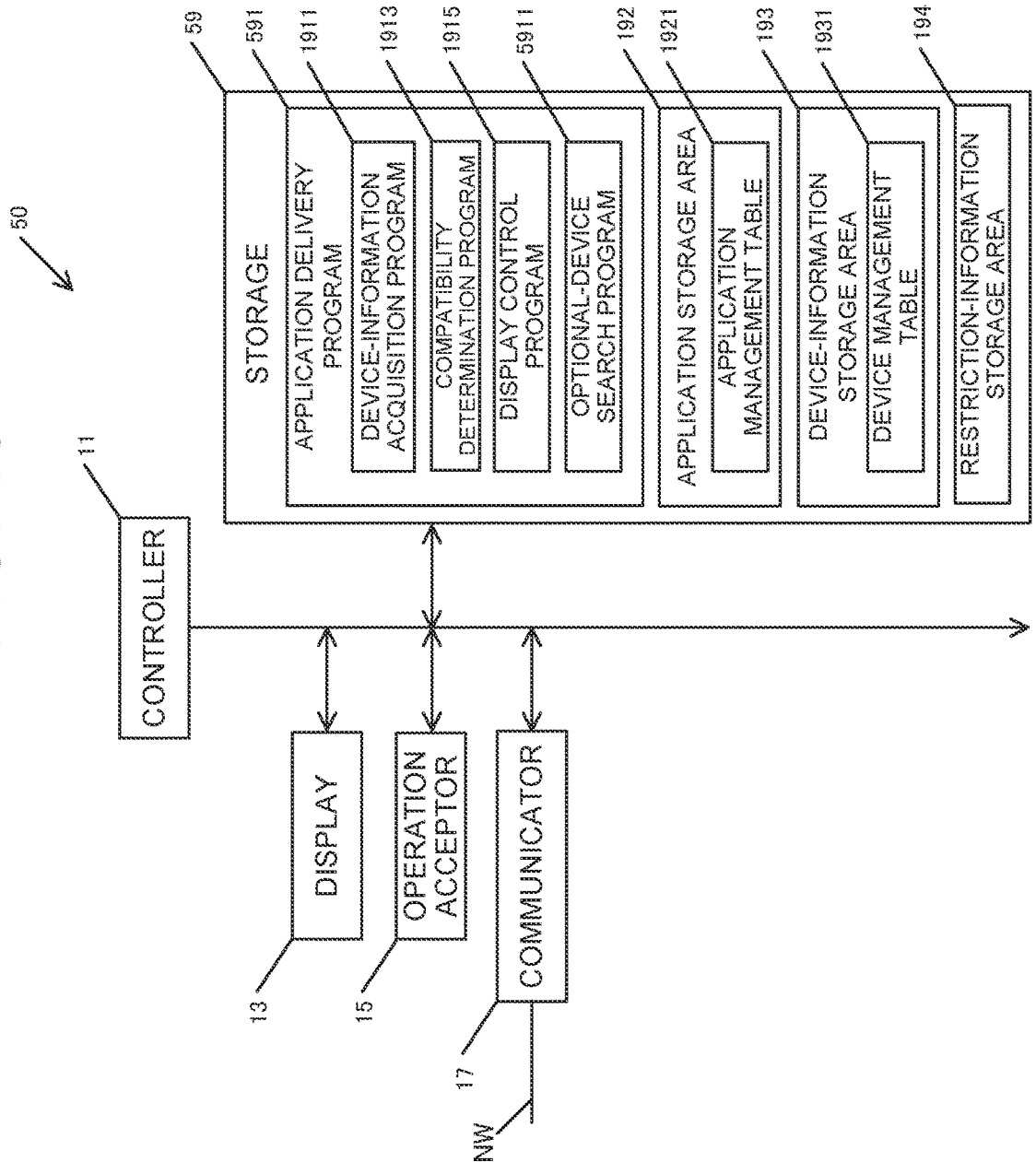
FIG. 16 is a functional configuration diagram of an application delivery device according to the second embodiment.

FIG. 16 is a functional configuration diagram of the application delivery device 50. The application delivery device 50 includes a storage 59 in place of the storage 19 of the application delivery device 10 of the first embodiment. Other configurations can be identical to those of the application delivery device 10 and are denote with the same symbols without repeating the descriptions thereof.

According to the second embodiment, the storage 59 stores therein an application delivery program 591 and secures an application storage area 192, a device-information storage area 193, and a restriction-information storage area 194.

The application delivery program 591 is a program read by the controller 11 when processing related to application delivery is executed. The application delivery program 591 includes a device-information acquisition program 1911, a compatibility determination program 1913, a display control program 1915, and an optional-device search program 5911.

The optional-device search program 5911 is a program read by the controller 11 when the MFP 30a that outputs an application delivery request is not equipped with an optional device is compatible with the application operating conditions. When the MFP 30a that has outputted an application delivery request is not equipped with an optional device compatible with the application operating conditions, the controller 11 that read out the optional-device search program 5911 searches the network NW to find the MFP 30 among the MFPs 30b to 30n that is equipped with an optional device compatible with the application operating conditions.

2.1.3 MFP 30a and MFPs 30b to 30n

The configuration of the MFP 30a and the MFPs 30b to 30n can be identical to that of the MFP 30 of the first embodiment, with the only difference being the optional device to be installed.

2.2 Process Flow

Figure 17:
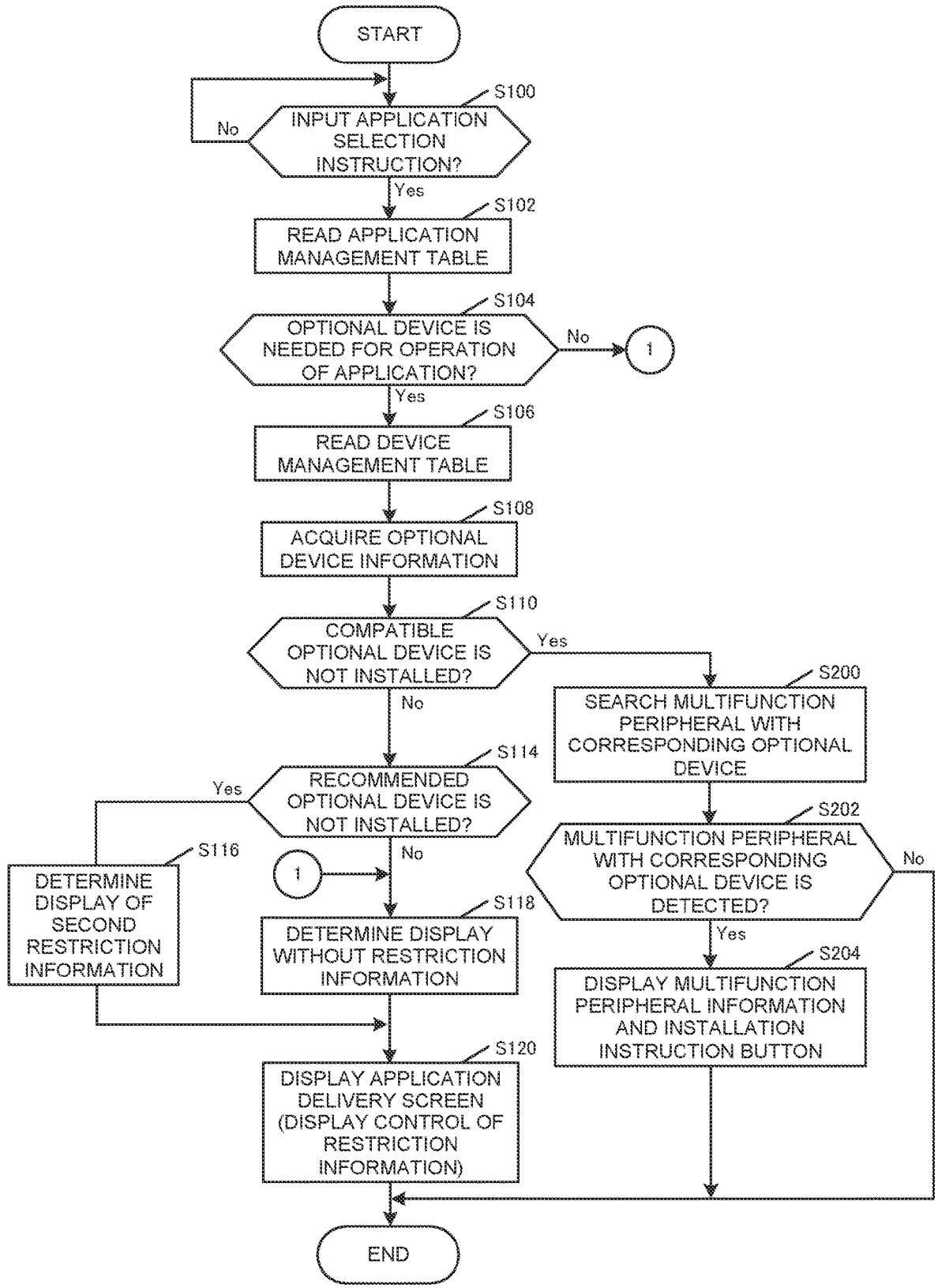
FIG. 17 is a flowchart illustrating a compatibility determination process according to the second embodiment.

The flow of an application compatibility determination process according to the second embodiment will now be described. The process according to the second embodiment replaces FIG. 8 of the first embodiment with FIG. 17. Therefore, the process that may be the same as that in FIG. 8 is denoted by the same step number and the description thereof is omitted. In FIG. 17, the process of when a compatible optional device is installed (the process from No in step S110) is the same as the process from step S114 in FIG. 8, so the explanation thereof is not repeated here.

The controller 11 determines whether a compatible optional device is not installed on the basis of the optional device information acquired in step S108 and a registered value (compatible optional device) in the application management table 1921 (step S110).

If it is determined that a compatible optional device is not installed, the controller 11 reads the optional-device search program 5911 of the application delivery program 591. The controller 11 that has read the optional-device search program 5911 searches for an MFP 30 equipped with an optional device corresponding to a compatible optional device among the MFPs 30b to 30n connected to the network NW (Yes in step S110 to step S200). At this time, the controller 11 can refer to the device management table 1931 in FIG. 4 to communicate with the other MFPs 30b to 30n to search for an MFP 30 equipped with the corresponding optional device.

When the controller 11 detects an MFP 30 equipped with the corresponding optional device, it causes the device information of the MFP 30 to be displayed on the application delivery screen. At this time, the controller 11 also displays, along with the device information, an instruction button for accepting an installation instruction as the destination for installing the application on the MFP 30 (Yes in step S202 to step S204).

If the controller 11 does not detect an MFP 30 equipped with the corresponding optional device installed, the process ends (No in step S202 to end).

If it is determined in step S110 that a compatible optional device is installed, the controller 11 executes the process from step S114 to step S120 (No in step S110 to step S114 through step S120).

2.3. Operation Examples

Figure 18:
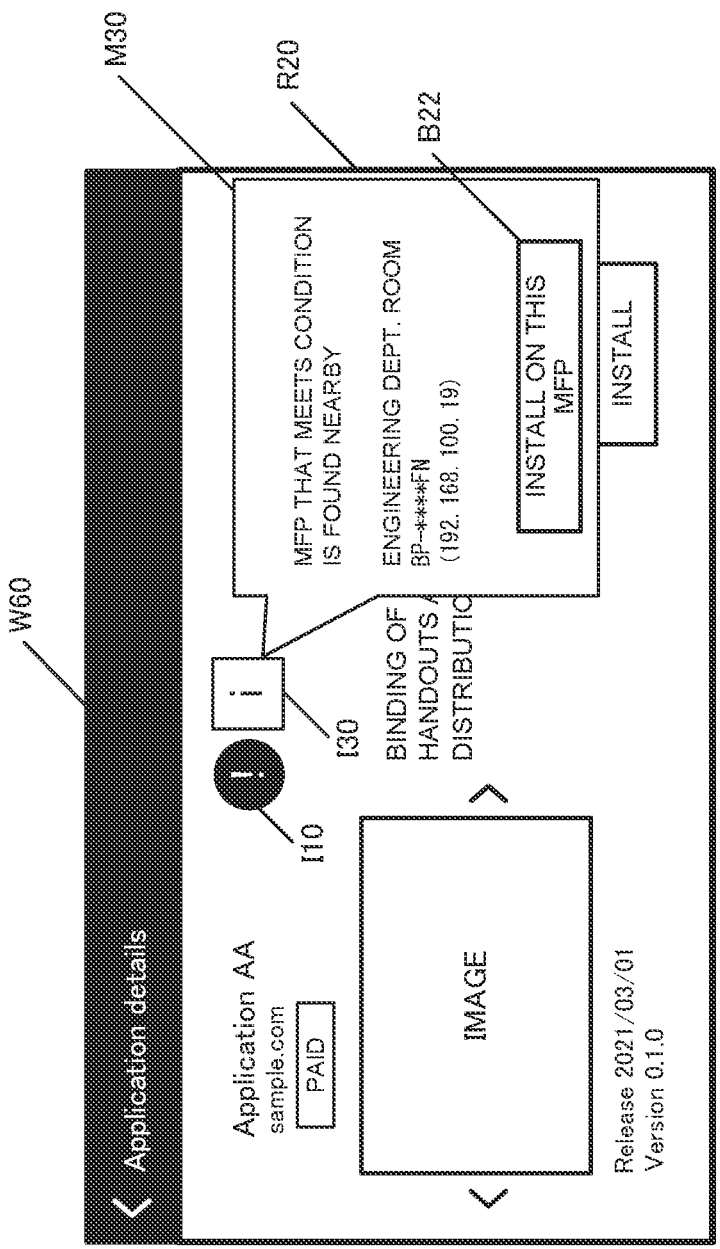
FIG. 18 is a diagram illustrating an operation example of the second embodiment.

The following explains operation examples according to the second embodiment. FIG. 18 is a display configuration example of an application detail screen W60 displaying device information on the MFP 30 equipped with an optional device corresponding to a compatible optional device and an instruction button for accepting an installation instruction for the application.

The application detail screen W60 can have the same structure as the application detail screen W40 illustrated in FIG. 12, but differs from the application detail screen W40 in that it includes a device-information display icon 130.

The device-information display icon 130 is a display icon that the controller 11 displays on the application detail screen W60 when an MFP 30 equipped with an optional device that corresponds to a compatible optional device is detected among the MFPs 30b to 30n connected to the network NW. Upon receiving a user's instruction to select the device-information display icon 130, the controller 11 displays the following pop-up message M30 with the following display content: "MFP that meets condition is found nearby" indicating that an MFP 30 equipped with an optional device that corresponds to the compatible optional device has been detected; "Engineering Dept. Room" (installation site) as device information on the corresponding MFP 30, "BP-*****FN" (model name), and "192.168.100.19" (IP address).

At this time, the controller 11 displays an install button B22, which accepts an application installation instruction for the detected MFP 30, together with the pop-up message M30. When an installation instruction is input by the selection of the install button B22, the controller 11 executes an installation process of the corresponding application for the detected MFP 30.

As described above, according to the second embodiment, in addition to the effects of the first embodiment, when an MFP as a device that outputs an application delivery request is not equipped with an optional device compatible with application operating conditions, other devices equipped with optional devices that correspond to the compatible optional device can be searched for on the network NW. When another device equipped with a corresponding optional device is detected, this device can be suggested to a user as an installation destination for the application.

3. Third Embodiment

The third embodiment provides an image forming device including the configuration of the application delivery device according to the first embodiment.

3.1. Functional Configuration

Figure 19:
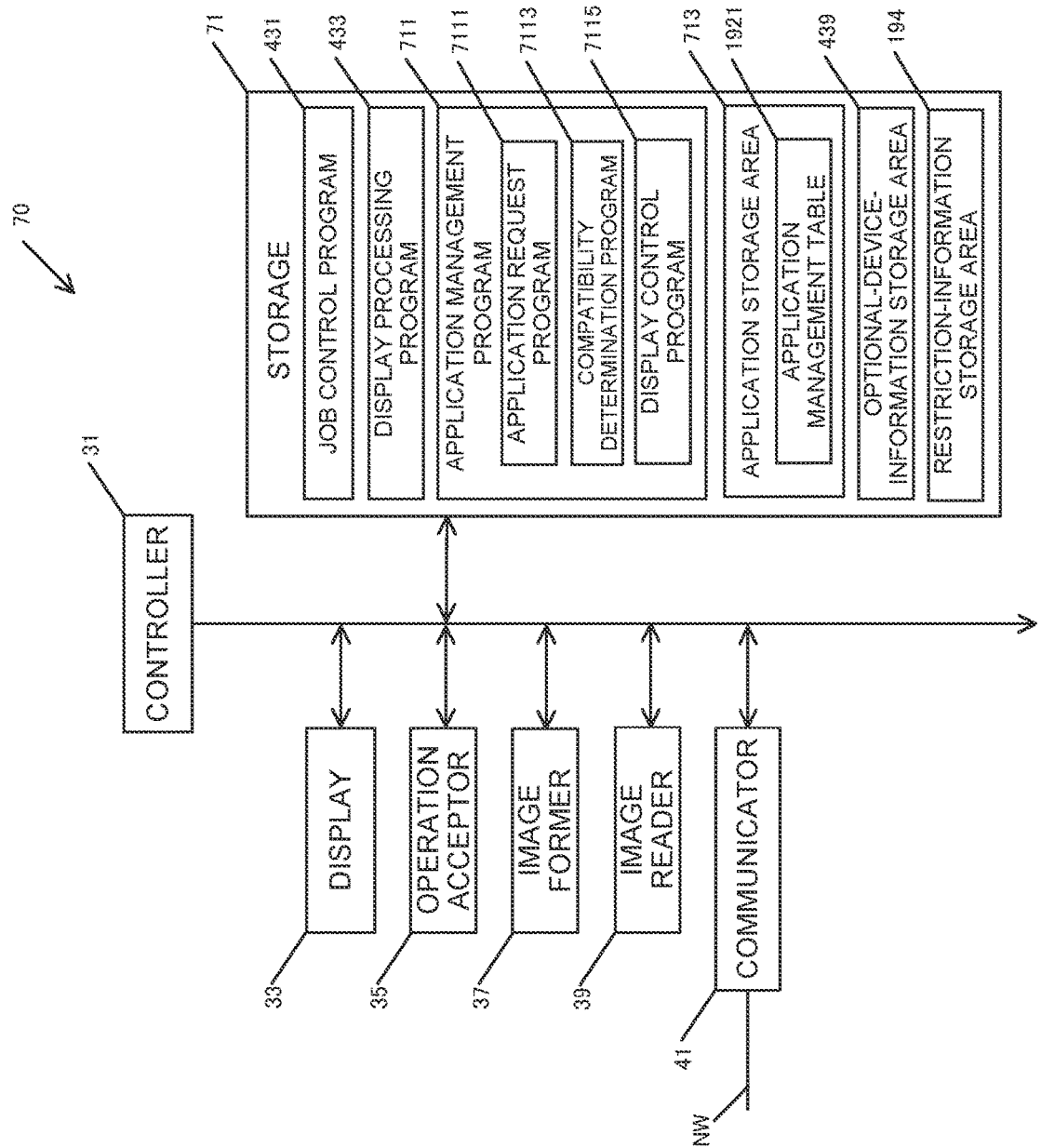
FIG. 19 is a functional configuration diagram of a multifunction peripheral according to a third embodiment.

FIG. 19 is a functional configuration diagram of an MFP 70 according to the third embodiment. The MFP 70 includes a storage 71 in place of the storage 43 of the MFP 30 according to the first embodiment. Other configurations can be identical to those of the MFP 30 and are denote with the same symbols without repeating the descriptions thereof. The same symbols denote the same configuration of the storage 71 as that already described, and the description thereof is not repeated.

In the third embodiment, the storage 71 stores therein a job control program 431, a display processing program 433, and an application management program 711, and reserves an application storage area 713, an optional-device-information storage area 439 and a restriction-information storage area 194.

The application management program 711 is a program read by the controller 31 when applications that are subject to installation and installed applications are comprehensively managed for the MFP 70. The application management program 711 includes an application request program 7111, a compatibility determination program 7113, and a display control program 7115.

The application request program 7111 is a program read by the controller 31, for example, when an application is requested to a service server provided by a vendor. The controller 31 that has read the application request program 7111 requests the service server or the like to supply an application. The controller 31 that has received an application stores the supplied application in the application storage area 713 and registers the necessary application information in the application management table 1921 described in the first embodiment. The application is not limited to be supplied from a service server, but may be supplied from a recording medium such as a CD-ROM.

The compatibility determination program 7113 is a program read by the controller 31 when whether or not the optional device installed to the host device is compatible with the operating conditions of the application requested to be provided. The controller 11 that has read the compatibility determination program 7113 uses the application management table 1921 stored in the application storage area 192 to check whether or not a compatible optional device or a recommended optional device is installed to the MFP 30 and determine the compatibility of the MFP 30 for the application by checking the acquired optional device information.

The display control program 7115 is a program read by the controller 31 when the display of the application delivery screen is controlled for the installation of applications. The controller 31 that read the display control program 7115 can function as an acceptor.

The application storage area 713 is a storage area that stores therein applications supplied by a service server or the like. The application storage area 713 stores therein the application management table 1921 for managing a corresponding application.

3.2 Process Flow 3.2.1 Overall Process

Figure 20:
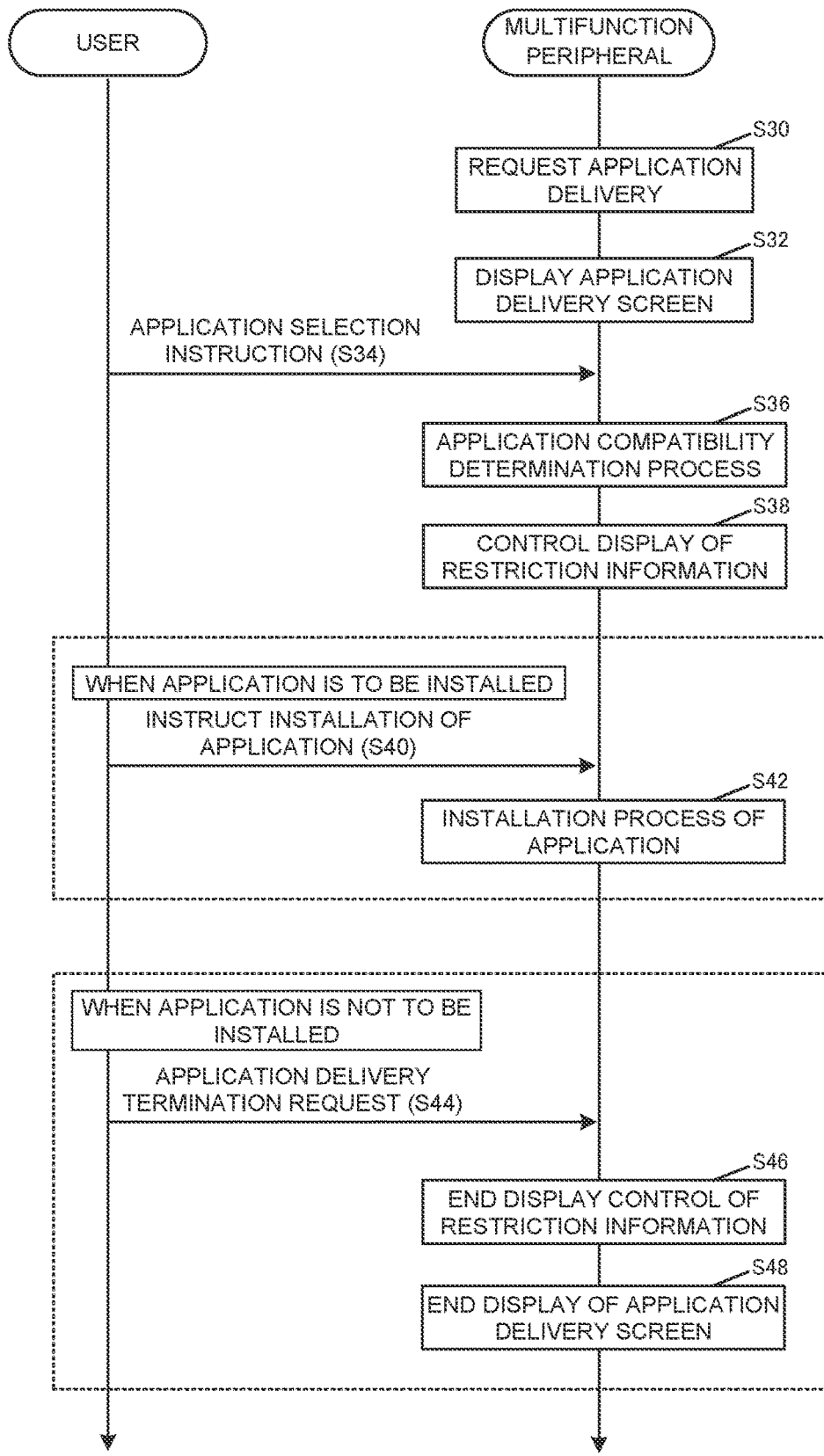
FIG. 20 is a sequence diagram for explaining overall processing according to the third embodiment.

The process flow according to the third embodiment will now be described. FIG. 20 is a sequence diagram for explaining the overall process according to the third embodiment.

First, the controller 31 of the MFP 70 requests the service server or the like (not illustrated) to supply an application. The controller 31 that has received the supply of the application from the service server (not illustrated) stores the supplied application in the application storage area 713 (step S30).

Next, the controller 31 displays an application delivery screen on the display 33 via application delivery (step S32). There is no particular restriction on the means or method of displaying the application delivery screen on the display 33. For example, an acceptance button or the like may be provided on the home screen displayed on the display 33 by the controller 31 of the MFP 70 as a basic screen to accept instructions to display the application delivery screen.

A user selects a desired application via the application delivery screen. The user's selection of an application is output to the controller 31 as an application selection instruction (step S34).

The controller 31 that has received the application selection instruction executes an application compatibility determination process (step S36).

On the basis of the results of the application compatibility determination, the controller 31 controls the display of restriction information pertaining to the application installation (step S38).

If it is determined to install an application on the basis of the results of referencing the application information and restriction information displayed on the application delivery screen, a user enters an installation instruction for the application desired to be installed via the application delivery screen (step S40).

The controller 31 that has received an application installation instruction executes an installation process for the application (step S42).

Meanwhile, if it is determined not to install an application, a user enters a request to end the application delivery via the application delivery screen (step S44).

The controller 31 that has received the request to end the application delivery ends the display control of the restriction information (step S46).

The controller 31 then ends the display of the application delivery screen (step S48) to end the series of processes. At this time, the controller 31 may delete the application stored in the application storage area 713 in step S30.

The application compatibility determination process in step S36 can be executed in accordance with the process explained with reference to the flowchart in FIG. 8, so the explanation is not repeated here.

As described above, according to the third embodiment, an application that is suitable for the host device can be installed without going through an application delivery device by obtaining in advance an application that may be installed in an MFP and determining the compatibility of the host device for the obtained application.

4. Modifications

The controller 11 of the application delivery device 10 according to the first or second embodiment refers to the device management table 1931 and acquires optional device information of the MFP 30 from the MFP 30 that has outputted an application selection instruction.

In a modification, for example, optional devices that are installed to image forming devices (MFP, fax machine, printer, etc.) that are managed are managed with a device management table, as in the device management table 1933 illustrated in FIG. 21.

In a modification, it is possible to execute an application compatibility determination process on the basis of the optional device information of the optional devices managed in the device management table 1933 and the registered values (compatible optional devices and recommended optional devices) in the application management table 1921. Therefore, according to the modifications, there is no need to acquire optional device information in the application compatibility determination process, and the processing burden related to the application compatibility determination process can be reduced.

In the first to third embodiments, an application compatibility determination process is executed by using the application management table 1921 illustrated in FIG. 3. However, the disclosure is not limited to an embodiment in which an application combability determination process is executed by using the application management table 1921, but also includes an embodiment in which applications have optional device information related to compatible optional devices and recommended optional devices, and the optional device information is used to execute the application compatibility determination process.

The present disclosure is not limited to the above-described embodiments, and various changes can be made. That is, embodiments obtained by combining technical measures modified as appropriate within a range that does not depart from the gist of the present disclosure are also included in the technical scope of the present disclosure.

Although some parts of the above-described embodiments are separately described for convenience of explanation, it is needless to say that the embodiments may be combined and implemented within a technically allowable range.

The program to be operated on each of the devices in the embodiments is a program that controls the CPU or the like (a program that makes a computer function) so as to implement the functions of the above-described embodiments.

The embodiments assume a device in which a plurality of programs are executed simultaneously as needed by multi-task processing. The information handled by the devices is temporarily accumulated in a temporary storage device (for example, a RAM) during processing of the information, and then, is stored in various storage devices such as a read-only memory (ROM) and an HDD, and is read, modified, and written by the CPU as necessary.

A recording medium used for storing the program may be any one of a semiconductor medium (for example, a ROM, a non-volatile memory card, or the like), an optical recording medium or a magnetooptical recording medium (for example, a digital versatile disc (DVD), a magnetooptical disc (MO), a mini disc (MD), a compact disc (CD), a Blu-ray® disc (BD), or the like), and a magnetic recording medium (for example, a magnetic tape, a flexible disk, or the like). Moreover, not only are the functions of the embodiments described above implemented by execution of a loaded program, but the functions of the present disclosure may also be implemented by processing performed in cooperation with an operating system or other application programs, etc., on the basis of an instruction for the program.

Furthermore, in a case where the programs are to be distributed to the market, the programs may be stored in a portable recording medium for distribution or transferred to a server computer connected via a network, such as the Internet. In this case, a storage device of the server computer is also included in the present disclosure as a matter of course.

What is claimed is:

1. A method of delivering an application, comprising:
   accepting a delivery request instruction for the application;
   acquiring device information on an optional device installed on a device having output the delivery request instruction for the application;
   determining whether the optional device compatible with an operating condition of the application pertaining to the delivery request instruction is installed on a basis of the acquired device information; and
   controlling a delivery of the application to the device.

2. The method according to claim 1, wherein the operating condition of the application is associated with information related to the application and information related to the optional device.

3. The method according to claim 1, wherein the application has information related to the optional device as the operating condition of the application.

4. The method according to claim 1, further comprising:
   displaying a delivery screen to accept the delivery request instruction for the application from a user; and
   controlling the delivery of the application for which the delivery request instruction is received through the delivery screen.

5. The method according to claim 4, further comprising:
   displaying first restriction information related to the delivery of the application on the delivery screen when the optional device is not installed, the optional device being compatible with the operating condition of the application for which the delivery request instruction is accepted from the user; and
   displaying second restriction information pertaining to the delivery of the application on the delivery screen when the optional device recommended based on the operating condition of the application is not installed.

6. The method according to claim 5, further comprising:

displaying the first restriction information or the second restriction information in response to a selection instruction for an icon displayed together with the application on the delivery screen.

7. The method according to claim 6, wherein the icon for accepting a display instruction for the first restriction information and the icon for accepting a display instruction for the second restriction information are displayed in different display modes.

8. The method according to claim 6, further comprising:

illustrating and displaying the optional device that is not installed in response to the selection instruction for the icon.

9. The method according to claim 1, further comprising:

acquiring information related to another device to which the optional device compatible with the operating condition of the application is installed when the optional device compatible with the operating condition of the application is not installed on the device; and proposing the other device as an installation destination of the application.

10. The method according to claim 1, further comprising:

displaying the application on a delivery screen, when the optional device compatible with the operating condition of the application is not installed, in a display mode different from a display mode of another application.

11. The method according to claim 10, further comprising:

restricting a selection of the application displayed in the display mode different from the display mode of the other application.

12. The method according to claim 1, further comprising:

restricting display of the application on a delivery screen when the optional device compatible with the operating condition of the application is not installed.

13. The method according to claim 1, further comprising:

restricting the delivery of the application when the optional device compatible with the operating condition of the application is not installed.

14. The method according to claim 1, wherein the device is an image forming device and the optional device is a processing device executing a process related to image formation.

15. An application delivery device comprising:

an operation acceptor; and a controller, wherein the controller:

accepts a delivery request instruction for an application from the operation acceptor, acquires device information on an optional device installed on a device having output the delivery request instruction for the application, determines whether the optional device compatible with an operating condition of the application pertaining to the delivery request instruction is installed on a basis of the device information, and controls a delivery of the application to the device.

* * * * *